US012641642B2

(12) United States Patent
Sakamoto et al.

(10) Patent No.: US 12,641,642 B2
(45) Date of Patent: May 26, 2026

(54) WIRELESS COMMUNICATION SYSTEM, COMMUNICATION APPARATUS, RELAY APPARATUS AND WIRELESS COMMUNICATION METHOD

(71) Applicant: NTT, Inc., Tokyo (JP)

(72) Inventors: Kazumitsu Sakamoto, Musashino (JP);
Kento Yoshizawa, Musashino (JP);
Yosuke Fujino, Musashino (JP);
Daisuke Goto, Musashino (JP);
Yasuyoshi Kojima, Musashino (JP);
Kiyohiko Itokawa, Musashino (JP)

(73) Assignee: NTT, Inc., Tokyo (JP)

( * ) Notice: Subject to any disclaimer, the term of this patent is extended or adjusted under 35 U.S.C. 154(b) by 433 days.

(21) Appl. No.: 18/037,466

(22) PCT Filed: Dec. 23, 2020

(86) PCT No.: PCT/JP2020/048183
§ 371 (c)(1),
(2) Date: May 17, 2023

(87) PCT Pub. No.: WO2022/137391
PCT Pub. Date: Jun. 30, 2022

(65) Prior Publication Data
US 2023/0413326 A1    Dec. 21, 2023

(51) Int. Cl.
*H04W 74/0816*    (2024.01)
*H04W 74/0833*    (2024.01)
*H04W 84/06*    (2009.01)

(52) U.S. Cl.
CPC ..... *H04W 74/0816* (2013.01); *H04W 74/085* (2013.01); *H04W 84/06* (2013.01)

(58) Field of Classification Search
CPC ........... H04W 74/0816; H04W 74/085; H04W 84/06; H04W 74/006; H04B 7/005; H04B 7/155; H04B 7/185
See application file for complete search history.

(56) References Cited

U.S. PATENT DOCUMENTS 5,874,913 A    2/1999 Blanchard et al.
10,826,599 B1 *  11/2020 Roy ..................... H04B 7/2125
(Continued)

FOREIGN PATENT DOCUMENTS

JP    S55107356 A    8/1980

OTHER PUBLICATIONS

IEEE Std 802. Nov. 2012, "9.3.3 Random backoff time," pp. 836-837, Mar. 2012.

*Primary Examiner* — Ivan O Latorre
(74) *Attorney, Agent, or Firm* — Harness, Dickey & Pierce, P.L.C.

(57)    ABSTRACT

A wireless communication system includes one or more communication devices located in a communication target area, and a relay device mountable on a moving body, in which the relay device includes a timing control unit that generates a transmission permission signal that is a signal representing transmission permission of an uplink signal, and a first transmission unit that transmits the transmission permission signal to the communication target area by a beam. The communication device includes a reception unit that obtains the transmission permission signal from the relay device, a transmission control unit that determines an earlier transmission timing as an elevation angle of the relay device viewed from the communication device is larger on a basis of the transmission permission signal, and a second transmission unit that transmits the uplink signal to the relay device at the transmission timing.

11 Claims, 16 Drawing Sheets

(56)     References Cited

U.S. PATENT DOCUMENTS

| | | | |
|---|---|---|---|
| 12,401,977 B2* | 8/2025 | Qiao | H04W 4/021 |
| 2008/0144493 A1 | 6/2008 | Yeh | |
| 2009/0213815 A1 | 8/2009 | Sherman et al. | |
| 2015/0280812 A1 | 10/2015 | Jalali | |
| 2017/0202016 A1 | 7/2017 | Itagaki et al. | |
| 2017/0222712 A1* | 8/2017 | Chang | H04W 72/0453 |
| 2017/0302368 A1* | 10/2017 | Trott | H04B 7/18502 |
| 2018/0024250 A1 | 1/2018 | Nishi et al. | |
| 2018/0343052 A1* | 11/2018 | Lv | H04W 48/18 |
| 2019/0090141 A1* | 3/2019 | Fujii | H04W 16/14 |
| 2021/0243622 A1* | 8/2021 | Tekgul | H04B 7/0632 |
| 2023/0067905 A1* | 3/2023 | Luo | H04W 74/0808 |
| 2023/0231596 A1* | 7/2023 | Goto | H04B 7/195 |
| | | | 370/306 |
| 2023/0403661 A1* | 12/2023 | Kim | H04W 56/001 |
| 2023/0413326 A1* | 12/2023 | Sakamoto | H04W 74/085 |
| 2024/0048206 A1* | 2/2024 | Goto | H04B 7/0617 |
| 2024/0048224 A1* | 2/2024 | Goto | H04B 7/185 |

* cited by examiner

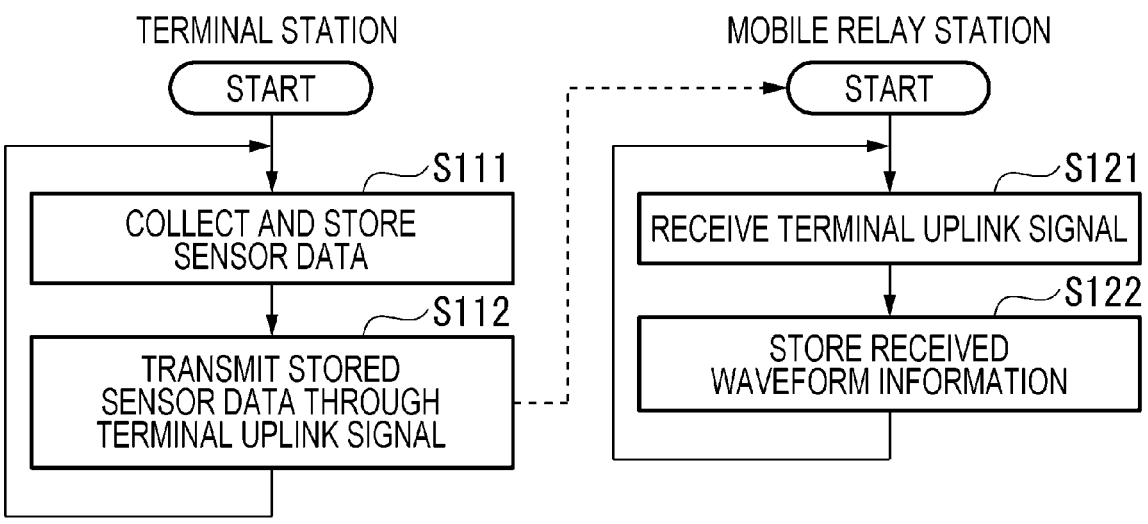

TERMINAL STATION

START

COLLECT AND STORE
SENSOR DATA　　S111

TRANSMIT STORED
SENSOR DATA THROUGH
TERMINAL UPLINK SIGNAL　　S112

MOBILE RELAY STATION

START

RECEIVE TERMINAL UPLINK SIGNAL　　S121

STORE RECEIVED
WAVEFORM INFORMATION　　S122

Fig. 3

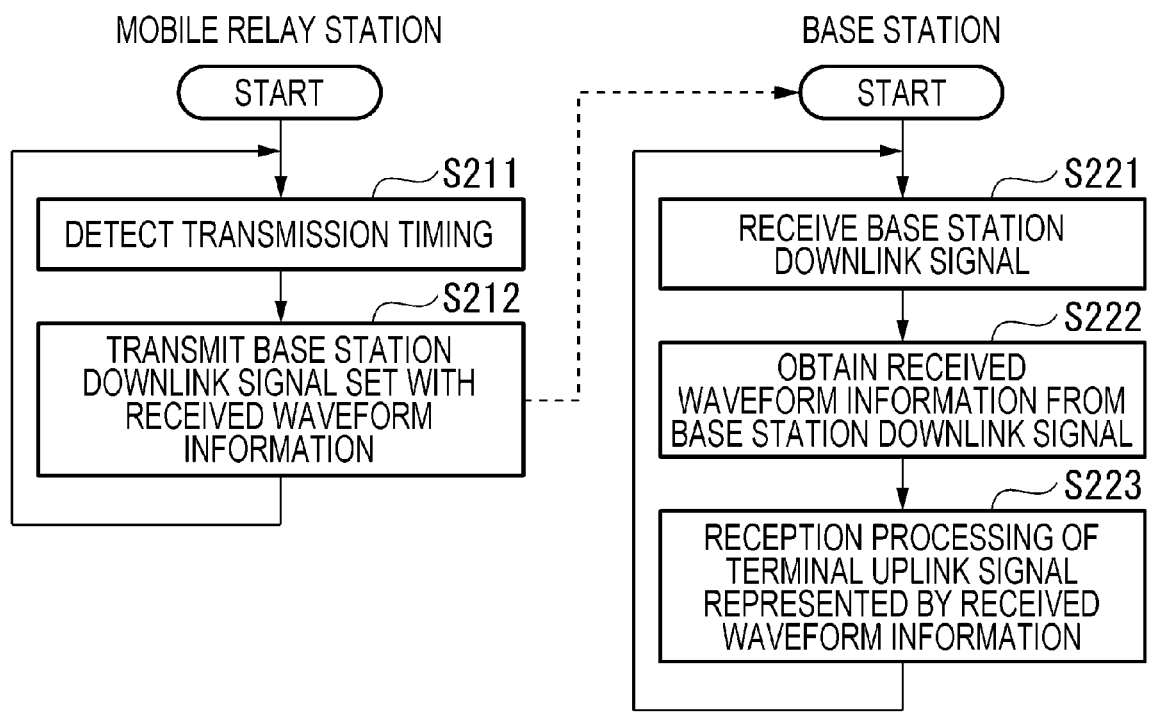

MOBILE RELAY STATION

START

DETECT TRANSMISSION TIMING　　S211

TRANSMIT BASE STATION
DOWNLINK SIGNAL SET WITH
RECEIVED WAVEFORM
INFORMATION　　S212

BASE STATION

START

RECEIVE BASE STATION
DOWNLINK SIGNAL　　S221

OBTAIN RECEIVED
WAVEFORM INFORMATION FROM
BASE STATION DOWNLINK SIGNAL　　S222

RECEPTION PROCESSING OF
TERMINAL UPLINK SIGNAL
REPRESENTED BY RECEIVED
WAVEFORM INFORMATION　　S223

Fig. 4

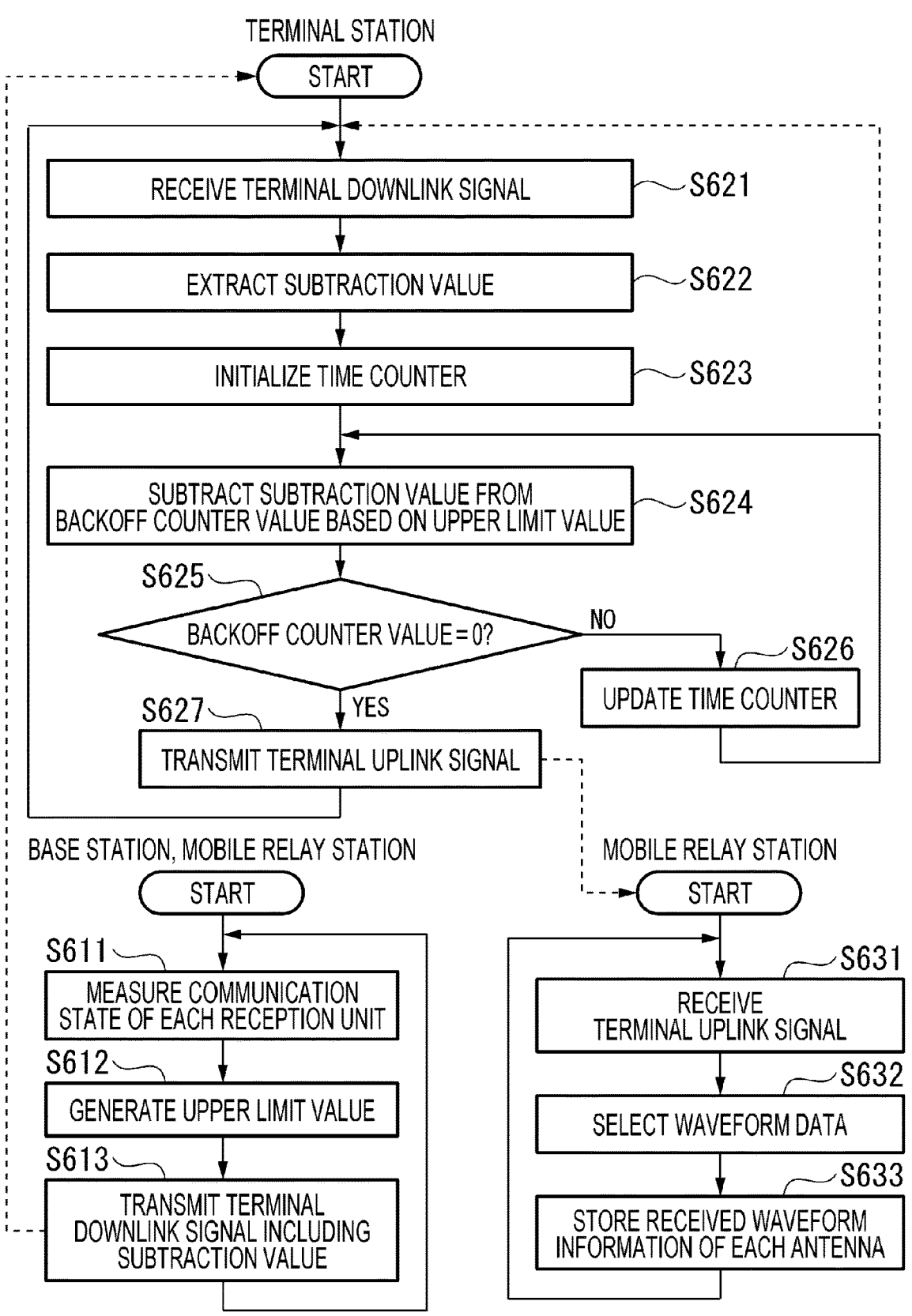

TERMINAL STATION

START

RECEIVE TERMINAL DOWNLINK SIGNAL ~S621

EXTRACT SUBTRACTION VALUE ~S622

INITIALIZE TIME COUNTER ~S623

SUBTRACT SUBTRACTION VALUE FROM
BACKOFF COUNTER VALUE BASED ON UPPER LIMIT VALUE ~S624

S625 BACKOFF COUNTER VALUE = 0?

NO ~S626 UPDATE TIME COUNTER

S627 YES

TRANSMIT TERMINAL UPLINK SIGNAL

BASE STATION, MOBILE RELAY STATION

START

S611 MEASURE COMMUNICATION
STATE OF EACH RECEPTION UNIT

S612 GENERATE UPPER LIMIT VALUE

S613 TRANSMIT TERMINAL
DOWNLINK SIGNAL INCLUDING
SUBTRACTION VALUE

MOBILE RELAY STATION

START

RECEIVE
TERMINAL UPLINK SIGNAL ~S631

SELECT WAVEFORM DATA ~S632

STORE RECEIVED WAVEFORM
INFORMATION OF EACH ANTENNA ~S633

Fig. 12

WIRELESS COMMUNICATION SYSTEM, COMMUNICATION APPARATUS, RELAY APPARATUS AND WIRELESS COMMUNICATION METHOD

CROSS-REFERENCE TO RELATED APPLICATIONS

This application is a 371 U.S. National Phase of International Application No. PCT/JP2020/048183, filed on Dec. 23, 2020. The entire disclosure of the above application is incorporated herein by reference.

TECHNICAL FIELD

The present invention relates to a wireless communication system, a communication apparatus, a relay apparatus, and a wireless communication method.

BACKGROUND ART

An Internet of Things (IoT) system that realizes various applications by connecting a small terminal device to the Internet has become widespread. A system in which a plurality of IoT terminals transmits environment information (for example, air temperature, room temperature, acceleration, luminous intensity, and the like) obtained by sensing to a cloud side by a radio signal and the cloud side collects the environment information is known as an application example of the IoT system. IoT terminals including various sensors are installed in various places (for example, buoys on the sea, ships, and mountainous areas). It is also assumed that IoT is used to collect data in a place where it is difficult to install a base station.

On the other hand, there is a wireless system that performs wireless communication between a plurality of communication devices on the ground and a relay station using a communication satellite, an unmanned aerial vehicle (UAV), or the like as the relay station. As a wireless system using a communication satellite as a relay station, there are a case where a low earth orbit (LEO) satellite orbiting in a low orbit at an altitude of about 1,000 km is used, and a case where a geostationary orbit (GEO) satellite orbiting at an altitude of 36,000 km is used. The propagation distance of the radio signal of the LEO satellite is shorter than the propagation distance of the radio signal of the GEO satellite. Therefore, in a case where a LEO satellite is used as a relay station of a radio signal, it is possible to realize communication with low delay and low propagation loss. Furthermore, in this case, the configuration of the high frequency circuit provided in the LEO satellite or the communication device on the ground becomes simple. However, unlike the GEO satellites, the LEO satellites orbit above the earth, so that the direction of the LEO satellites as viewed from the communication device on the ground changes at all times. The visible time per orbit of the LEO satellite in each communication device on the ground is several minutes. Therefore, a time zone in which the LEO satellite and each communication device on the ground can communicate with each other is limited.

On the other hand, a low power wide area (LPWA) is known as a wireless system capable of wide-area communication at a low power and a low transmission rate suitable for communication of IoT terminals. Recently, a satellite IoT system with a communication satellite that collects data from an IoT terminal using the LPWA has been studied. In general, wireless communication between a communication satellite and a communication device on the ground has a longer propagation distance than wireless communication in which direct communication is performed between a plurality of communication devices on the ground. However, the LPWA can be applied by using a LEO satellite. In the case of such a satellite IoT system, it is possible to accommodate IoT terminals in the aeronautical field, the marine field, and the ruler area, which are difficult only with a normal LPWA. In addition, in this case, since a hub station is not required, service deployment is facilitated.

Recently, the number of IoT terminals has been increasing. In addition, since the LPWA has a low data rate, the time during which the IoT terminal transmits data becomes relatively long. Therefore, as the number of IoT terminals increases, an increase in data packet collision is concerned. On the other hand, there is a method of avoiding collision at the time of data reception in the base station by autonomous and distributed transmission schedule control of the terminal in the LPWA network. In this method, the transmission timing of each terminal is expressed by a phase oscillator model. When data to be transmitted is generated, each terminal waits until its own phase becomes zero and then performs transmission. In this method, data collision is avoided by realizing an anti-phase synchronization state in which phases of all terminals are equal to each other.

In addition, it is effective to utilize a backoff algorithm in a carrier sense multiple access with collision avoidance (CSMA/CA) scheme as a collision avoidance means when a large number of IoT terminals on the ground transmit a terminal uplink signal to a LEO satellite triggered by a transmission permission signal from the LEO satellite (see Non Patent Document 1). The CSMA/CA scheme is a scheme adopted in a wireless LAN system standardized by IEEE 802.11. In the CSMA/CA method, the IoT terminal that has received the transmission permission signal from the LEO satellite sets a random number uniformly distributed in a range from zero to a contention window (CW) to the backoff counter. The IoT terminal decreases the backoff counter by one every unit time, and transmits the terminal uplink signal to the LEO satellite at a timing when the backoff counter becomes zero. As a result, it is possible to uniformly distribute the transmission timings of a large number of IoT terminals and reduce the collision probability.

CITATION LIST

Non Patent Document

Non Patent Document 1: IEEE Std 802.11-2012, "9.3.3 Random backoff time", pp. 836-837, March 2012.

SUMMARY OF INVENTION

Technical Problem

In the IoT system, in order to ensure the reliability of communication, each IoT terminal may repeat data transmission to the base station a plurality of times. Furthermore, since a large number of IoT terminals transmit data, transmission opportunities exceeding the number of slots may occur. As described above, in the IoT system, the congestion degree of communication may fluctuate. However, conventionally, the terminals simply and uniformly transmit data at different timings given to the terminals. In addition, the method does not control the transmission schedule according to the occupancy state of the base station. Therefore, conventionally, in a case where the degree of congestion of communication fluctuates, data collision may occur, and the reliability of communication may be deteriorated. In addition, in the transmission timing control in which the data transmission timing is simply distributed by the method described in Non Patent Literature 1, there may be a case where it is not possible to suppress a decrease in communication reliability.

In view of the above circumstances, an object of the present invention is to provide a wireless communication system, a communication device, a relay device, and a wireless communication method capable of suppressing a decrease in communication reliability.

Solution to Problem

An aspect of the present invention is a wireless communication system including one or more communication devices located in a communication target area; and a relay device mountable on a moving body, in which the relay device includes a timing control unit that generates a transmission permission signal that is a signal representing transmission permission of an uplink signal, and a first transmission unit that transmits the transmission permission signal to the communication target area by a beam, and the communication device includes a reception unit that obtains the transmission permission signal from the relay device, a transmission control unit that determines an earlier transmission timing as an elevation angle of the relay device viewed from the communication device is larger on a basis of the transmission permission signal, and a second transmission unit that transmits the uplink signal to the relay device at the transmission timing.

An aspect of the present invention is a wireless communication method executed by a wireless communication system including one or more communication devices located in a communication target area, and a relay device mountable on a moving body, the wireless communication method including, by the relay device, generating a transmission permission signal that is a signal representing transmission permission of an uplink signal, transmitting the transmission permission signal to the communication target area by a beam, by the communication device, obtaining the transmission permission signal from the relay device, determining an earlier transmission timing as an elevation angle of the relay device viewed from the communication device is larger on a basis of the transmission permission signal, and transmitting the uplink signal to the relay device at the transmission timing.

An aspect of the present invention is a communication device that is located in a communication target area and transmits an uplink signal to a relay device mountable on a moving body, the communication device including a reception unit configured to obtain a transmission permission signal from the relay device, the transmission permission signal being a signal representing transmission permission of the uplink signal, a transmission control unit that determines an earlier transmission timing as an elevation angle of the relay device viewed from the communication device is larger on a basis of the transmission permission signal, and a transmission unit that transmits the uplink signal to the relay device at the transmission timing.

An aspect of the present invention is a relay device that is mountable on a moving body and obtains an uplink signal from one or more communication devices located in each small area of a communication target area, the relay device including a timing control unit that includes a parameter that makes a transmission timing of the uplink signal earlier as an elevation angle of the relay device viewed from the communication device is larger in a transmission permission signal that is a signal representing transmission permission of the uplink signal, and a transmission unit that transmits the transmission permission signal including the parameter to each small area of the communication target area in a time division manner.

Advantageous Effects of Invention

According to the present invention, it is possible to suppress a decrease in communication reliability.

BRIEF DESCRIPTION OF DRAWINGS

FIG. 3 is a flowchart illustrating data collection processing of the wireless communication system according to the first embodiment.

FIG. 4 is a flowchart illustrating data collection processing of the wireless communication system according to the first embodiment.

FIG. 12 is a flowchart illustrating transmission control processing of the wireless communication system according to the fifth embodiment.

DESCRIPTION OF EMBODIMENTS

Embodiments of the present invention are now described in detail with reference to the drawings.

First Embodiment

Figure 1:
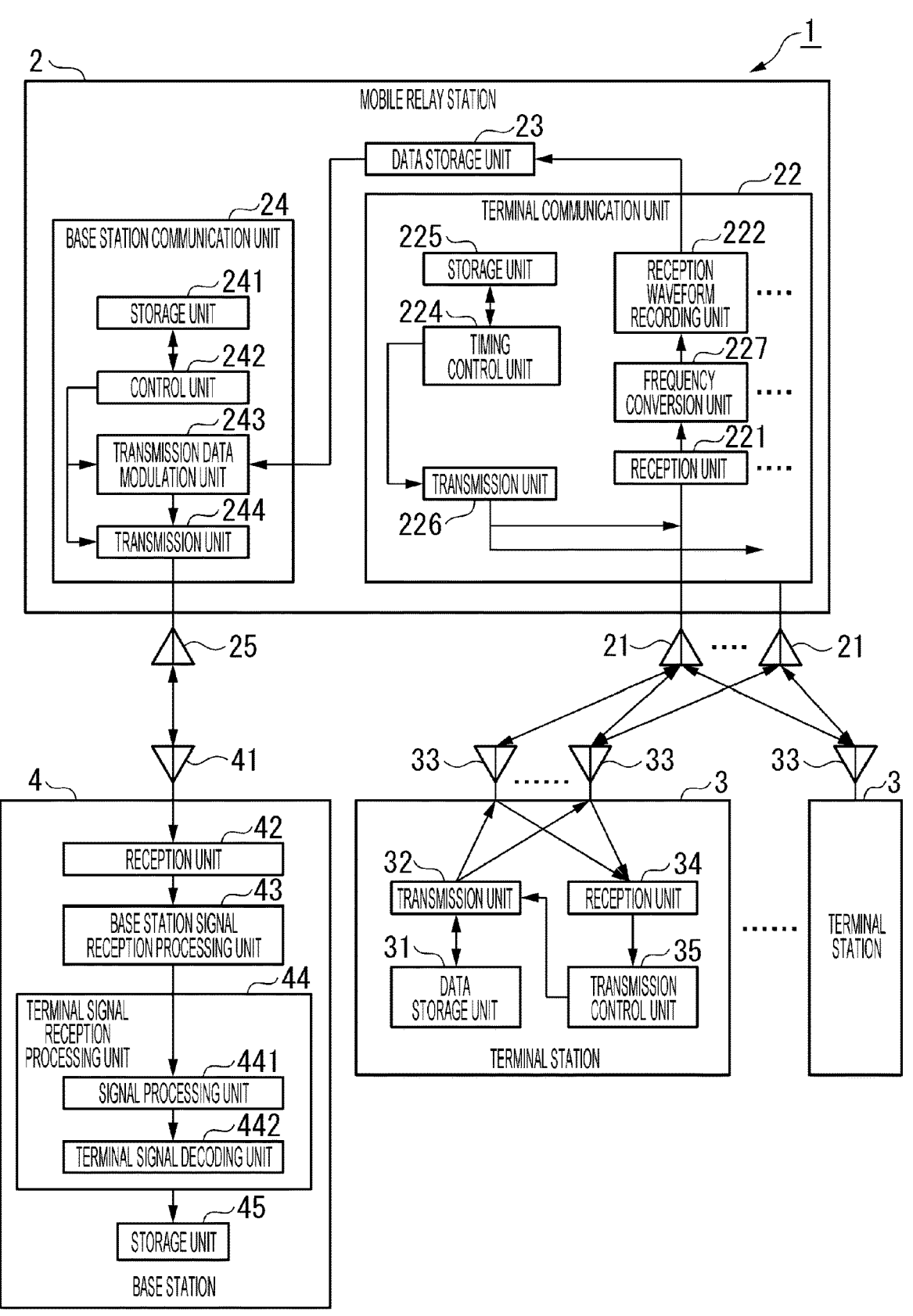
FIG. 1 is a configuration diagram of a wireless communication system according to a first embodiment.

FIG. 1 is a configuration diagram of a wireless communication system 1 according to the first embodiment. The wireless communication system 1 includes a mobile relay station 2, a terminal station 3, and a base station 4. Although the wireless communication system 1 can include any number of each of the mobile relay stations 2, the terminal stations 3, and the base stations 4, it is assumed that the number of terminal stations 3 is large. The wireless communication system 1 is a communication system that transmits information for which immediacy is not required. The information transmitted from each of the plurality of terminal stations 3 is transmitted via the mobile relay station 2 and collected by the base station 4.

The mobile relay station 2 is an example of a relay device that is mounted on a moving body and has a communicable area which moves with the lapse of time. The mobile relay station 2 is provided in, for example, the low earth orbit (LEO) satellite. The altitude of the LEO satellite is 2000 km or less, and the LEO satellite orbits above the earth in about 1.5 hours per orbit. The terminal station 3 and the base station 4 are installed on the earth such as on the ground or on the sea. The plurality of terminal stations 3 exist at different places. The terminal station 3 is, for example, an IoT terminal. The terminal station 3 collects data such as environmental data detected by a sensor and transmits the collected data to the mobile relay station 2 by a radio signal. In FIG. 1, only two terminal stations 3 are illustrated. The mobile relay station 2 receives data transmitted from each of the plurality of terminal stations 3 by a radio signal while moving over the earth. The mobile relay station 2 accumulates data extracted from these received radio signals. The mobile relay station 2 collectively wirelessly transmits the accumulated data to the base station 4 at a timing at which communication with the base station 4 is possible. The base station 4 obtains data collected by the terminal station 3 from the mobile relay station 2.

It is conceivable to use a relay station mounted on an unmanned aerial vehicle such as a GEO satellite, a drone, or a high altitude platform station (HAPS) as the mobile relay station 2. However, in a case where the relay station is mounted on a GEO satellite, the link budget for the IoT terminal installed on the ground is very small because the altitude of the GEO satellite is high although the coverage area (footprint) on the ground is large. On the other hand, in a case where the relay station is mounted on the drone or the HAPS, the link budget is high, but the coverage area is narrow. Furthermore, the drone requires batteries and the HAPS requires solar panels. In the present embodiment, the mobile relay station 2 is mounted on an LEO satellite. Thus, in addition to the link budget remaining within limits, the LEO satellite orbits outside the atmosphere, so the air resistance to the LEO satellite is small and the LEO satellite consumes less fuel. In addition, the footprint of the LEO satellite is larger than that in a case where the relay station is mounted on the drone or the HAPS.

Since the mobile relay station 2 mounted on the LEO satellite performs communication while moving at high speed, the time during which each of the terminal stations 3 or the base stations 4 can communicate with the mobile relay station 2 is limited. Specifically, when the mobile relay station 2 is viewed from the terminal station 3 on the ground, the mobile relay station 2 passes over the terminal station 3 in about several minutes. In addition, wireless communication schemes of various specifications are used for the terminal station 3. Therefore, the mobile relay station 2 receives the terminal uplink signal from the terminal station 3 within the coverage at the current position during movement. The mobile relay station 2 stores the waveform data of the received terminal uplink signal. The mobile relay station 2 wirelessly transmits a base station downlink signal including waveform data of the terminal uplink signal to the base station 4 at a timing when the base station 4 exists in coverage. The base station 4 obtains waveform data of the base station downlink signal received from the mobile relay station 2. The base station 4 decodes the symbol of the terminal uplink signal represented by the waveform data to obtain terminal transmission data which is data transmitted by the terminal station 3.

In the wireless communication system 1 according to the present embodiment, the mobile relay station 2 and the terminal station 3 perform wireless communication using the LPWA as an example. Each terminal station 3 may transmit the same terminal uplink signal to the mobile relay station 2 a plurality of times to ensure communication reliability. Furthermore, as described above, it is assumed that the number of terminal stations 3 is large. With such a configuration, the communication amount of the terminal uplink signal (data) transmitted from the terminal station 3 to the mobile relay station 2 may increase, and the communication band may be congested. The wireless communication system 1 according to the present embodiment controls the transmission timing in the transmission of the terminal uplink signal from the terminal station 3 to the mobile relay station 2 in order to prevent the congestion of the communication band.

Specifically, the mobile relay station 2 transmits a transmission permission signal indicating permission to transmit the terminal uplink signal (radio signal to the mobile relay station) to the terminal station 3 in advance by using the terminal downlink signal (radio signal to the terminal station). The terminal station 3 adjusts the transmission timing of the terminal uplink signal to the mobile relay station 2 according to the reception level (power level) of the transmission permission signal included in the terminal downlink signal. In this manner, the mobile relay station 2 controls transmission probability of the terminal uplink signal of the terminal station 3 by devising the method of transmitting the terminal downlink signal.

In addition, the terminal downlink signal includes an upper limit value. The upper limit value is a value of a contention window (CW). This upper limit value may represent, for example, that the average or upper limit of the number of times of transmission of the terminal uplink signal in one hour is two. The mobile relay station 2 mounted on the LEO satellite passes over the communication target area or the vicinity thereof once or more by orbiting the earth. The terminal station 3 determines the number of transmission times of transmitting the terminal uplink signal in the unit time based on the upper limit value included in the received terminal downlink signal.

Note that details of the configuration and operation of each device in the processing for controlling the transmission timing and the number of transmission times in transmitting the terminal uplink signal from the terminal station 3 to the mobile relay station 2 (hereinafter, referred to as "transmission control processing") will be described later. Hereinafter, details of the configuration and operation of each device in processing by the base station 4 for collecting data such as environmental data transmitted from each terminal station 3 via the mobile relay station 2 (hereinafter, referred to as "data collection processing") will be first described.

(Data Collection Processing)

A configuration of each device in the data collection processing will be described.

The mobile relay station 2 includes a plurality of antennas 21, a terminal communication unit 22, a data storage unit 23, a base station communication unit 24, and an antenna 25.

The terminal communication unit 22 includes a plurality of reception units 221, a plurality of reception waveform recording units 222, and a plurality of frequency conversion units 227. The reception unit 221 receives the terminal uplink signal by multiple-input multiple-output (MIMO) using the plurality of antennas 21. The frequency conversion unit 227 performs frequency modulation processing on a terminal uplink signal (radio frequency (RF) signal). That is, the frequency conversion unit 227 converts the terminal uplink signal into a baseband signal using a quadrature demodulator or the like. The reception waveform recording unit 222 samples the received waveform (baseband signal) of the terminal uplink signal and generates waveform data indicating a value obtained by the sampling. The reception waveform recording unit 222 writes, in the data storage unit 23, the received waveform information including the reception time of the terminal uplink signal in the antenna 21 and the generated waveform data. The data storage unit 23 stores the received waveform information written by the reception waveform recording unit 222.

The base station communication unit 24 transmits the received waveform information to the base station 4 by a base station downlink signal of an arbitrary wireless communication scheme. The base station communication unit 24 includes a storage unit 241, a control unit 242, a transmission data modulation unit 243, and a transmission unit 244. The storage unit 241 stores the transmission timing derived on the basis of the orbit information of the LEO. The transmission time may be represented by, for example, a predetermined elapsed time from the transmission timing. Note that the LEO orbit information is information that can obtain the position, velocity, moving direction, and the like of the LEO satellite at an arbitrary time.

The control unit 242 controls the transmission data modulation unit 243 and the transmission unit 244 to transmit the received waveform information to the base station 4 at the transmission timing derived on the basis of the orbit information. The transmission data modulation unit 243 reads the received waveform information from the data storage unit 23 as transmission data, and modulates the read transmission data to generate a base station downlink signal. The transmission unit 244 converts the base station downlink signal from an electric signal (baseband signal) into a radio signal (RF signal), and transmits the radio signal from the antenna 25.

The terminal station 3 includes a data storage unit 31, a transmission unit 32, and one or a plurality of antennas 33. The data storage unit 31 stores sensor data and the like. The transmission unit 32 reads the sensor data as terminal transmission data from the data storage unit 31, and transmits a terminal uplink signal including the read terminal transmission data from the antenna 33 by a radio signal. The transmission unit 32 transmits a signal by the LPWA. The LPWA includes LoRaWAN (registered trademark), Sigfox (registered trademark), LTE-M (Long Term Evolution for Machines), NB (Narrow Band)-IoT, and the like, but any wireless communication scheme can be used. Furthermore, the transmission unit 32 may perform transmission with another terminal station 3 by time division multiplexing, orthogonal frequency division multiplexing (OFDM), or the like. The transmission unit 32 determines a channel and a transmission timing to be used for transmission of a terminal uplink signal by a local station by a method determined in advance in the wireless communication scheme to be used. In addition, the transmission unit may perform beam formation of signals to be transmitted from the plurality of antennas 33 by the method determined in advance in the wireless communication scheme to be used.

The base station 4 includes an antenna 41, a reception unit 42, a base station signal reception processing unit 43, and a terminal signal reception processing unit 44.

The reception unit 42 converts the base station downlink signal received using the antenna 41 into an electric signal (RF signal). The base station signal reception processing unit 43 obtains received waveform information from the received signal (baseband signal) converted into the electrical signal by the reception unit 42. The base station signal reception processing unit 43 outputs the received waveform information to the terminal signal reception processing unit 44.

The terminal signal reception processing unit 44 performs reception processing of the terminal uplink signal indicated by the received waveform information. At this time, the terminal signal reception processing unit 44 performs reception processing according to the wireless communication scheme used for transmission by the terminal station 3 to obtain terminal transmission data. The terminal signal reception processing unit 44 includes a signal processing unit 441 and a terminal signal decoding unit 442.

The signal processing unit 441 reads the waveform data of the same reception time from the received waveform information. The signal processing unit 441 executes frequency conversion processing on the signal represented by the waveform data associated with an antenna identifier of an antenna 21-$n$. The signal processing unit 441 obtains a symbol by performing frame detection, Doppler shift compensation, offline beam control, and the like on each obtained received waveform information (baseband signal). The signal processing unit 441 outputs the obtained symbol to the terminal signal decoding unit 442. The signal processing unit 441 may perform the frame detection after performing the processing of compensating for the Doppler shift of the terminal uplink signal received by the antenna 21 of the mobile relay station 2 on the signal indicated by the waveform data. The Doppler shift received by the terminal uplink signal received by the antenna 21 is derived in advance on the basis of the position of the terminal station 3 and orbit information of the LEO on which the mobile relay station 2 is mounted. The offline beam control is reception beam control which is not performed by the mobile relay station 2, but performed by the base station 4 as post-processing, in which the recorded waveform data is transmitted from the mobile relay station 2 to the base station 4. The terminal signal decoding unit 442 decodes the symbol input from signal processing unit 441 to obtain terminal transmission data transmitted from terminal station 3.

Hereinafter, a value set to the backoff counter is referred to as a "backoff counter value". Hereinafter, the variable value used for subtracting the backoff counter value is referred to as a "subtraction value". The subtraction value is, for example, a value (real number) within a range of zero to one. For example, the backoff counter is updated by subtracting the subtraction value from the backoff counter value. The backoff counter value "x" is, for example, a random number value with a predetermined contention window size (upper limit value) as an upper limit.

The terminal signal reception processing unit 44 records position information of each terminal station 3 in the storage unit 45. The storage unit 45 stores the position information of each terminal station 3. In addition, the storage unit 45 stores orbit information of the mobile relay station 2 in advance. In addition, the storage unit 45 stores the transmission start timing calculated in advance on the basis of the orbit information of the LEO satellite equipped with the mobile relay station 2 and the position of the base station 4.

Figure 2:
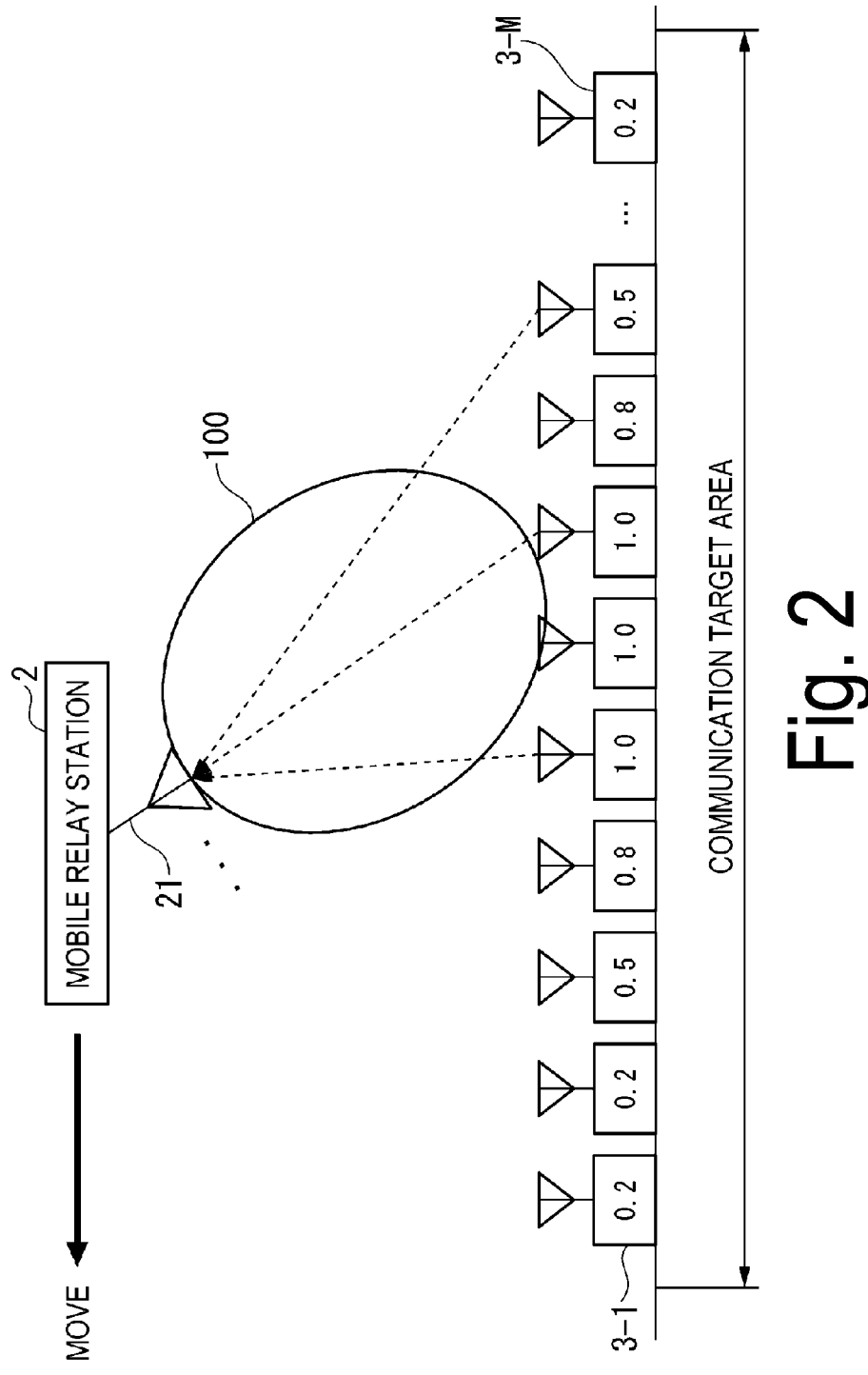
FIG. 2 is a diagram illustrating an example of a relationship between a position of a mobile relay station with respect to each terminal station and a variable value based on a reception level of a transmission permission signal in each terminal station according to the first embodiment.

FIG. 2 is a diagram illustrating an example of a relationship between a position of the mobile relay station 2 with respect to each terminal station 3 and a variable value (subtraction value) based on a reception level of a transmission permission signal in each terminal station 3. In FIG. 2, the mobile relay station 2 is mounted on a LEO satellite that is moving above the communication target area or the vicinity thereof. In general, as the elevation angle of the mobile relay station 2 becomes larger, it is easier to separate the terminal uplink signals transmitted from each of the terminal stations 3.

Each terminal station 3 sets the subtraction value to a larger value as the reception level of the transmission permission signal transmitted from the antenna 21 using a beam 100 is higher. In FIG. 2, M devices (M is an integer of one or more) are located in the communication target area. The value described in each terminal station 3 illustrated in FIG. 2 represents an example of the subtraction value. For example, the subtraction value of the terminal station 3-1 is "0.2" in one example.

The terminal station 3 changes the transmission probability according to the reception level of the transmission permission signal. For example, as the elevation angle of the mobile relay station 2 becomes larger, the reception level of the transmission permission signal becomes higher. Therefore, the terminal station 3 increases the transmission probability of the terminal uplink signal as the reception level of the transmission permission signal is higher. That is, the terminal station 3 increases the transmission probability of the terminal uplink signal as the elevation angle of the mobile relay station 2 is larger.

Each terminal station 3 may transmit position information indicating its own position to the mobile relay station 2 at a timing at which it can communicate with the mobile relay station 2. The mobile relay station 2 may collect and accumulate waveform data including the position information of each terminal station 3. The mobile relay station 2 may transmit waveform data including the accumulated position information of each terminal station 3 to the base station 4 at a timing at which the mobile relay station 2 can communicate with the base station 4.

The mobile relay station 2 controls the reception level of the transmission permission signal in the terminal station 3 in the communication target area by controlling the transmission beam pattern of the transmission permission signal irradiated in the communication target area on the ground using the transmission beam. As a result, the mobile relay station 2 controls the transmission probability of the terminal uplink signal of each terminal station 3 for each small area that divides the communication target area.

Note that the mobile relay station 2 may tilt the beam 100 (transmission beam) rearward in the moving direction of the mobile relay station 2 such that the transmission beam pattern spreads rearward in the moving direction of the mobile relay station 2 in the communication target area on the ground. As a result, the mobile relay station 2 can increase the transmission probability of the terminal uplink signal of the terminal station 3 that has passed in the sky.

An operation of the wireless communication system 1 in the data collection processing will be described.

FIG. 3 is a flowchart illustrating processing of the wireless communication system 1 in a case where a terminal uplink signal is transmitted from the terminal station 3. The terminal station 3 obtains data detected by a sensor (not illustrated) provided internally or externally at any time, and writes the obtained data in the data storage unit 31 (step S111). The transmission unit 32 reads the sensor data from the data storage unit 31 as terminal transmission data. The transmission unit 32 wirelessly transmits a terminal uplink signal including terminal transmission data from the antenna 33 at a transmission timing obtained in advance on the basis of a reception level of a transmission permission signal transmitted from an LEO satellite equipped with the mobile relay station 2 (step S112). The terminal station 3 repeats the processing from step S111.

The reception unit 221 of the mobile relay station 2 receives the terminal uplink signal transmitted from the terminal station 3 (step S121). Depending on the wireless communication scheme of the terminal station 3 as transmission source, the terminal uplink signal may be received from only one terminal station 3 in a time division manner for the same frequency. The reception waveform recording unit 222 writes, in the data storage unit 23, the received waveform information which associates the waveform data representing the waveform of the terminal uplink signal received by the reception unit 221 with the reception time (step S122). The mobile relay station 2 repeats the processing from step S121.

FIG. 4 is a flowchart illustrating processing of the wireless communication system 1 in a case where a base station downlink signal is transmitted from the mobile relay station 2. When detecting that the transmission timing derived on the basis of the orbit information has come, the control unit 242 included in the base station communication unit 24 of the mobile relay station 2 instructs the transmission data modulation unit 243 and the transmission unit 244 to transmit the received waveform information (step S211). The transmission data modulation unit 243 reads the received waveform information accumulated in the data storage unit 23 as transmission data, and modulates the read transmission data to generate a base station downlink signal. The transmission unit 244 transmits the base station downlink signal generated by the transmission data modulation unit 243 from the antenna 25 by a radio signal (step S212). The mobile relay station 2 repeats the processing from step S211.

The antenna 41 of the base station 4 receives the base station downlink signal from the mobile relay station 2 (step S221). The reception unit 42 converts the base station downlink signal received by the antenna 41 into a received signal of an electrical signal and outputs the received signal to the base station signal reception processing unit 43. The base station signal reception processing unit 43 obtains received waveform information from the received signal (step S222). The base station signal reception processing unit 43 outputs the received waveform information obtained to the terminal signal reception processing unit 44.

The terminal signal reception processing unit 44 performs reception processing of the terminal uplink signal represented by the waveform data included in the received waveform information (step S223). Specifically, the signal processing unit 441 specifies the wireless communication scheme used by the terminal station 3 to transmit the terminal uplink signal by executing frame detection on the basis of the information specific to the wireless communication scheme included in the received signal represented by the waveform data. The signal processing unit 441 obtains a symbol by performing frame detection, Doppler shift compensation, offline beam control, and the like on the received signal represented by the waveform data. The signal processing unit 441 outputs the symbol to the terminal signal decoding unit 442. The terminal signal decoding unit 442 decodes the symbol input from the signal processing unit 441 by the specified wireless communication scheme. Accordingly, the terminal signal decoding unit 442 obtains terminal transmission data transmitted from terminal station 3. Note that the terminal signal decoding unit 442 can also use a decoding method with a large calculation load, such as successive interference cancellation (SIC). The base station 4 repeats the processing from step S221.

(Transmission Control Processing)

A configuration of each device in the transmission control processing will be described.

Configurations of the mobile relay station 2 and a part of the base station 4 will be described. As illustrated in FIG. 1, the mobile relay station 2 further includes a timing control unit 224, a storage unit 225, and a transmission unit 226.

The timing control unit 224 of the mobile relay station 2 controls the timing of transmitting the terminal downlink signal including the transmission permission signal to the terminal station 3. As described above, the transmission permission signal is a control signal indicating that the terminal station 3 is permitted to transmit data such as environmental data to the mobile relay station 2. The timing control unit 224 generates a terminal downlink signal including an upper limit value.

The transmission unit 226 obtains the terminal downlink signal generated by the timing control unit 224. The transmission unit 226 transmits the terminal downlink signal including the transmission permission signal and the upper limit value from the antenna 21 by a radio signal. The transmission unit 226 determines a channel to be used for transmission of a terminal downlink signal by the local station by a method determined in advance in the wireless communication scheme to be used. The timing at which the transmission unit 226 transmits the terminal downlink signal is controlled by the timing control unit 224.

As described above, the mobile relay station 2 is provided in, for example, an LEO satellite that orbits over the earth at a predetermined cycle. The timing control unit 224 includes the upper limit value in the terminal downlink signal. For example, the timing control unit 224 may include, in the terminal downlink signal, an upper limit value generated when the terminal uplink signal is received from substantially the same terminal station 3 in substantially the same time zone in the past. In addition, the timing control unit 224 may include, in the terminal downlink signal, an upper limit value generated immediately before (for example, one minute before) the timing of transmitting the terminal downlink signal to the terminal station 3.

The storage unit 225 may store, for each terminal station 3, a predicted value of the transmission timing derived in advance in the terminal station 3 on the basis of the reception level of the transmission permission signal transmitted from the LEO satellite equipped with the mobile relay station 2. In addition, the upper limit value may be updated on the basis of the predicted value of the transmission timing of each terminal station 3.

In addition, the storage unit 225 stores in advance terminal identification information for identifying the terminal station 3 and position information indicating the position of the terminal station 3. The timing control unit 224 determines the terminal station 3 to be notified of the transmission permission signal on the basis of the current position of the local station and the current position of the terminal station 3. The timing control unit 224 specifies terminal identification information of the specified terminal station 3. The timing control unit 224 may include the specified terminal identification information in the transmission permission signal.

A configuration of the terminal station 3 will be described. As illustrated in FIG. 1, the terminal station 3 further includes a reception unit 34 and a transmission control unit 35.

The reception unit 34 receives the terminal downlink signal using the antenna 33.

The transmission control unit 35 obtains a transmission permission signal from the terminal downlink signal received by the reception unit 34. Note that the transmission control unit 35 may obtain terminal identification information included in the extracted transmission permission signal. If the obtained terminal identification information is identification information associated with the local terminal station, the transmission control unit 35 may extract information of the upper limit value from the transmission permission signal. If the obtained terminal identification information is not the identification information associated with the local terminal station, the transmission control unit 35 may suspend the transmission of the terminal uplink signal from the transmission unit 32 to the mobile relay station 2.

The transmission control unit 35 may determine the number of times of repeatedly transmitting the same terminal uplink signal to the mobile relay station 2 on the basis of the obtained upper limit value.

The transmission unit 32 starts transmitting the terminal uplink signal. The transmission unit 32 reads the sensor data as terminal transmission data from the data storage unit 31, and transmits a terminal uplink signal including the read terminal transmission data from the antenna 33 by a radio signal. The transmission unit 32 transmits a signal by the LPWA, for example. In addition, the transmission unit 32 repeatedly transmits the same terminal uplink signal for the number of times of transmission determined by the transmission control unit 35.

The reception unit 221 of the mobile relay station 2 receives the terminal uplink signal using the antenna 21. The frequency conversion unit 227 performs frequency modulation processing on a terminal uplink signal (RF signal). That is, the frequency conversion unit 227 converts the terminal uplink signal into a baseband signal using a quadrature demodulator or the like. The reception waveform recording unit 222 samples the received waveform (baseband signal) of the terminal uplink signal and generates waveform data indicating a value obtained by the sampling. Since each sensor data is transmitted a plurality of times in the terminal station 3, a plurality of pieces of waveform data corresponding to the same terminal uplink signal is to be generated.

The reception waveform recording unit 222 selects, for example, waveform data having the best reception state from the plurality pieces of waveform data corresponding to the same terminal uplink signal. The reception waveform recording unit 222 writes, in the data storage unit 23, the received waveform information including the reception time of the terminal uplink signal in the antenna 21 and the selected waveform data. The data storage unit 23 stores the received waveform information written by the reception waveform recording unit 222. Note that the reception waveform recording unit 222 may write, into the data storage unit 23, for example, received waveform information including waveform data generated by averaging the plurality pieces of waveform data corresponding to the same terminal uplink signal.

An operation of the wireless communication system 1 in the transmission control processing will be described.

Figure 5:
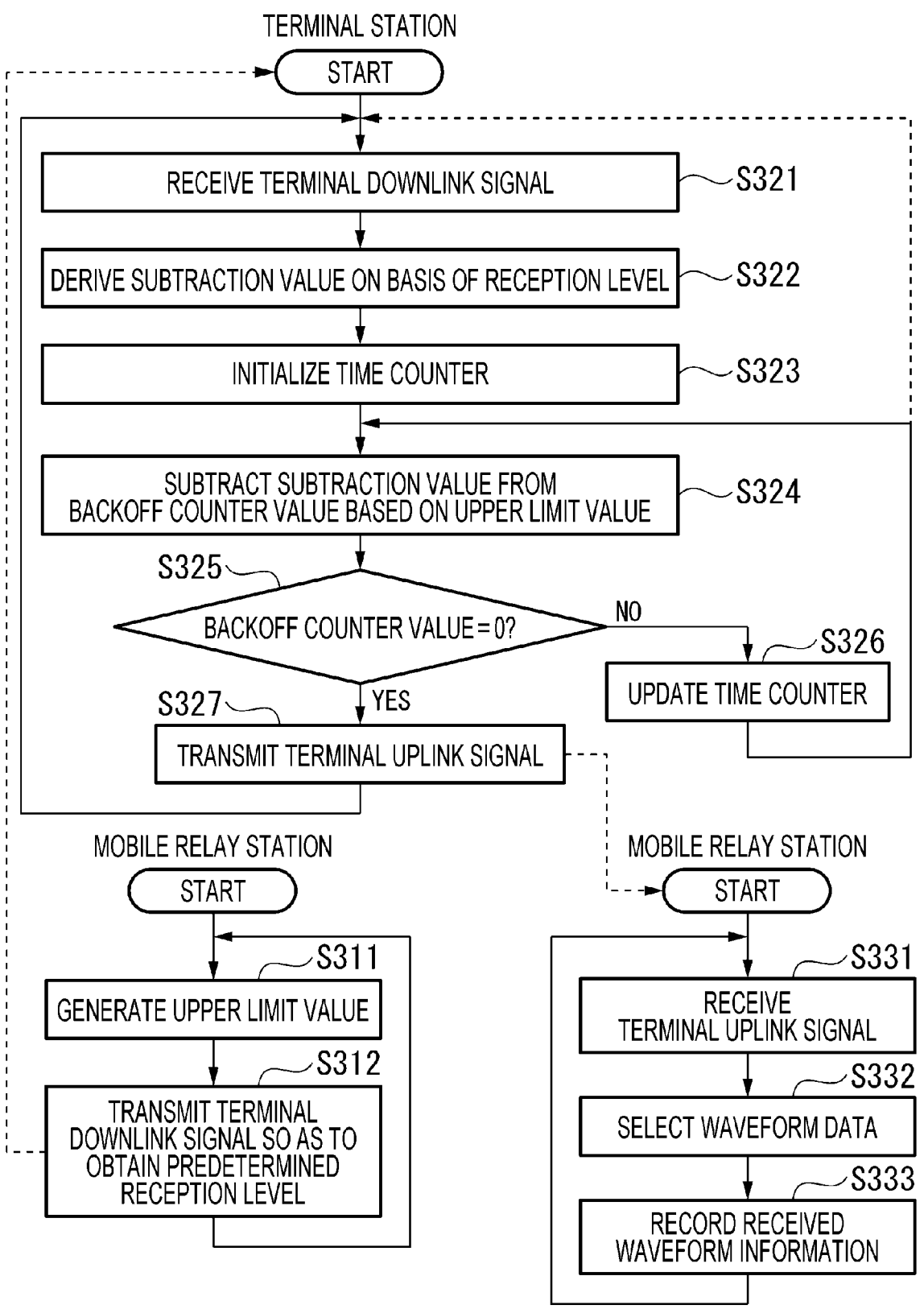
FIG. 5 is a flowchart illustrating transmission control processing of the wireless communication system according to the first embodiment.

FIG. 5 is a flowchart illustrating processing of the wireless communication system 1 in a case where a terminal downlink signal is transmitted from the mobile relay station 2 to the terminal station 3. The timing control unit 224 generates an upper limit value (step S311). The timing control unit 224 generates a transmission permission signal including terminal identification information of the terminal station 3 to which the transmission permission signal is to be notified, and an upper limit value. The transmission unit 226 obtains the transmission permission signal from the timing control unit 224. The transmission unit 226 transmits the terminal downlink signal including the obtained transmission permission signal from the antenna 21 by a radio signal. Here, the transmission unit 226 adjusts the transmission power of the terminal downlink signal so that the transmission permission signal has a predetermined reception level in the terminal station 3, and transmits the terminal downlink signal from the antenna 21 (step S312). The mobile relay station 2 repeats the processing from step S311.

The reception unit 34 of the terminal station 3 receives the terminal downlink signal transmitted from the mobile relay station 2 using the antenna 33 (step S321). If the terminal identification information included in the transmission permission signal in the terminal downlink signal is the terminal identification information associated with the local station, the transmission control unit 35 derives the subtraction value "w" on the basis of the reception level of the transmission permission signal. The transmission control unit 35 derives a backoff counter value "x" of zero or more on the basis of the upper limit value extracted from the transmission permission signal. The backoff counter value "x" is, for example, a random positive value with a predetermined contention window size as an upper limit (step S322). The transmission control unit 35 initializes a time counter "t" to "t=1" (step S323). The transmission control unit 35 subtracts the subtraction value "w" from the backoff counter value "x" based on the upper limit value. As a result, the transmission control unit 35 updates the backoff counter value to "x=x− w" (step S324).

The transmission control unit 35 determines whether or not the backoff counter value "x" is zero. Note that the transmission control unit 35 may determine whether or not the backoff counter value is zero or less (step S325). If it is determined that the backoff counter value "x" is not zero (step S325: No), the transmission control unit 35 updates the time counter "t" to "t+1" (step S326), and returns the process to step S324. If it is determined that the backoff counter value "x" is zero (step S325: Yes), the transmission control unit 35 transmits the terminal uplink signal using the antenna 21 (step S327).

The transmission unit 32 reads the sensor data from the data storage unit 31 as terminal transmission data, and transmits a terminal uplink signal including the read terminal transmission data from the antenna 33 by a radio signal. Here, the transmission unit 32 may transmit the same terminal uplink signal a plurality of times by the number of times of transmission determined by using the upper limit value (step S327). The terminal station 3 repeats the processing from step S321.

Note that the transmission control unit 35 may return the processing from step S326 to step S321 at a predetermined cycle. In this case, in step S322 subsequent to step S321, the subtraction value does not need to be updated.

The reception unit 221 of the mobile relay station 2 receives the terminal uplink signal transmitted from the terminal station 3 a plurality of times using the antenna 21 (step S331). The reception waveform recording unit 222 samples the each received waveform of the plurality of terminal uplink signals received by the reception unit 221 and generates each waveform data indicating a value obtained by the sampling. The reception waveform recording unit 222 selects, for example, waveform data having the best reception state from the plurality pieces of waveform data corresponding to the same terminal uplink signal (step S332). The reception waveform recording unit 222 records, in the data storage unit 23, the received waveform information including the reception time of the terminal uplink signal in the antenna 21 and the selected waveform data (step S333). The mobile relay station 2 repeats the processing from step S331.

As described above, the wireless communication system 1 according to the first embodiment includes one or more terminal stations 3 (communication devices) (communication apparatuses) located in the communication target area and the mobile relay station 2 (relay device) (relay apparatus) mountable on the moving body. The timing control unit 224 (timing controller) generates a transmission permission signal that is a signal representing transmission permission of the terminal uplink signal (uplink signal). The timing control unit 224 determines a transmission level of the transmission permission signal. The transmission unit 226 (first transmission unit) (first transmitter) transmits the transmission permission signal to the communication target area by a beam (transmission beam). Here, the transmission unit 226 transmits the transmission permission signal to the communication target area with a beam at a transmission level determined by the timing control unit 224. The reception unit 34 (receptor) obtains the transmission permission signal from the mobile relay station 2. The transmission control unit 35 (timing controller) determines, on the basis of the transmission permission signal, an earlier transmission timing as the elevation angle of the mobile relay station 2 viewed from the terminal station 3 is larger. Since the reception level of the transmission permission signal is higher as the elevation angle of the mobile relay station 2 is larger, the transmission control unit 35 may set an earlier transmission timing as the reception level of the transmission permission signal is higher. For example, the transmission control unit 35 derives a subtraction value, which is a variable value used for subtraction, to a larger value as the reception level of the transmission permission signal is higher. The transmission control unit 35 subtracts a subtraction value from a backoff counter value of zero or more derived on the basis of a predetermined upper limit value. The transmission control unit 35 determines the timing at which the backoff counter value becomes zero or less as the transmission timing. The transmission unit 32 (second transmission unit) (second transmitter) transmits the uplink signal to the mobile relay station 2 at the derived transmission timing.

Accordingly, the wireless communication system 1 can suppress a decrease in communication reliability. In addition, the wireless communication system 1 can control the transmission timing of the terminal uplink signal from the terminal station 3 to the mobile relay station 2.

The transmission unit 226 (first transmission unit) may incline the beam rearward in the moving direction of the mobile relay station 2 using the plurality of antennas 21 such that the beam pattern spreads rearward in the moving direction of the mobile relay station 2 in the communication target area.

In addition, the mobile relay station 2 generates an upper limit value. The mobile relay station 2 may include the transmission permission signal and the upper limit value in the terminal downlink signal and transmit the signal to the terminal station 3. The terminal station 3 obtains a transmission permission signal indicated by the terminal downlink signal received. The terminal station 3 determines the transmission timing on the basis of the reception level of the transmission permission signal. The terminal station 3 transmits a terminal uplink signal to the mobile relay station 2 at the transmission timing.

In addition, the terminal station 3 determines the number of transmission times of repeatedly transmitting the terminal uplink signal on the basis of the upper limit value included in the terminal downlink signal. As a result, the wireless communication system 1 can control using the upper limit value so as to reduce the number of times of transmission of the terminal uplink signal from the terminal station 3. In addition, sensor data transmitted from more terminal stations 3 can be transmitted to the base station 4 via the mobile relay station 2.

Second Embodiment

In the second embodiment, the base station estimates an area with a high density degree of terminal stations. The base station estimates the density degree of the terminal stations for each area on the basis of the position information notified by the terminal station. The mobile relay station starts data collection from the terminal station in the area from an early stage when the mobile relay station approaches the area. The mobile relay station performs transmission beam control such that a reception level of a transmission permission signal is increased in a terminal station located in an area where the density degree of terminal stations is high.

Figure 6:
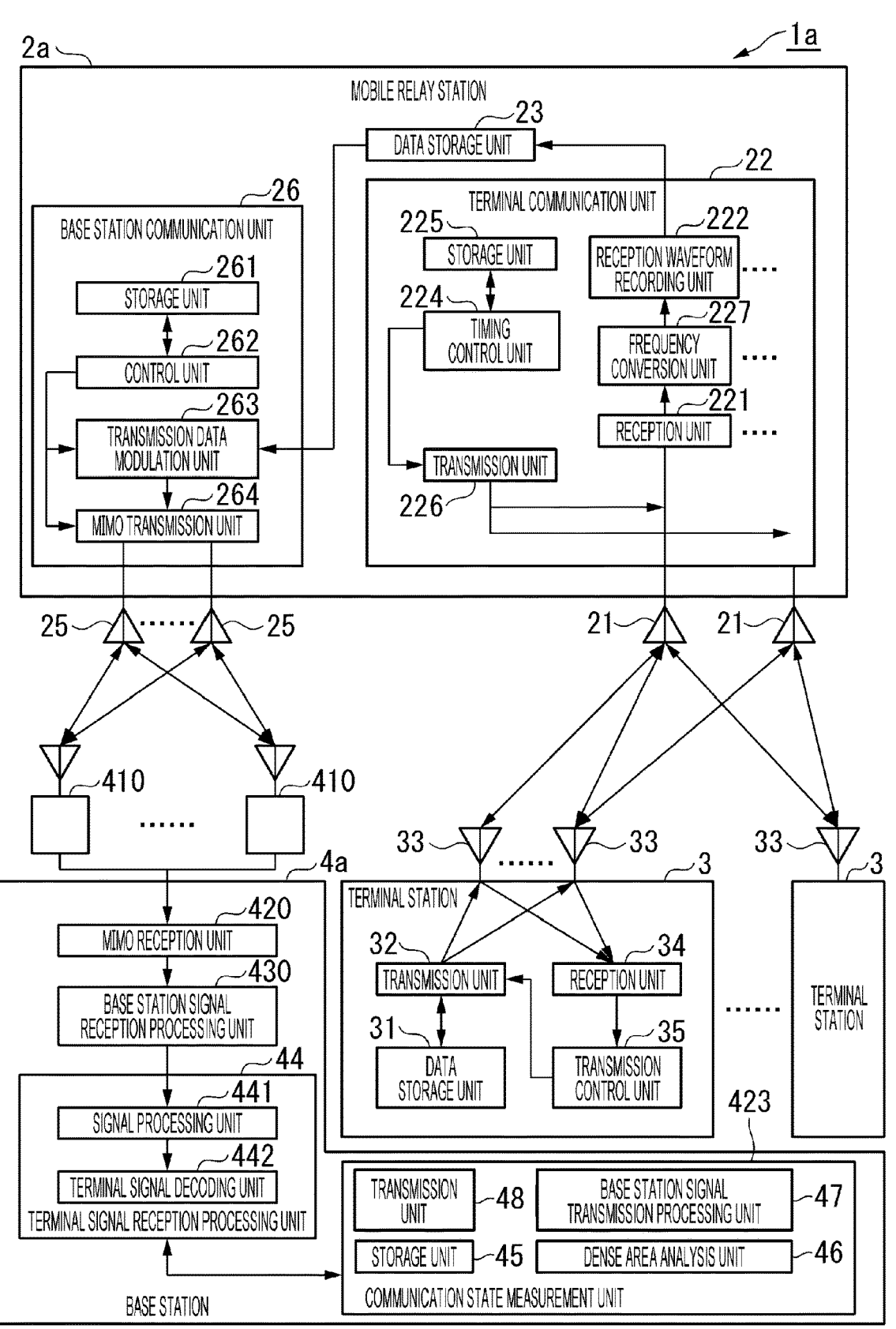
FIG. 6 is a configuration diagram of the wireless communication system according to a second embodiment.

FIG. 6 is a configuration diagram of a wireless communication system 1a according to the second embodiment. In the drawing, the same configurations as those of the wireless communication system 1 according to the first embodiment illustrated in FIG. 1 are assigned with the same reference numerals as those used in FIG. 1, and explanation thereof is not made herein. The wireless communication system 1a includes a mobile relay station 2a, a terminal station 3, and a base station 4a.

The mobile relay station 2a includes a plurality of antennas 21, a terminal communication unit 22, a data storage unit 23, a plurality of antennas 25, and a base station communication unit 26. The base station communication unit 26 transmits the received waveform information to the base station 4a by MIMO. The base station communication unit 26 includes a storage unit 261, a control unit 262, a transmission data modulation unit 263, and a MIMO transmission unit 264.

The storage unit 261 stores orbit information of the LEO satellite equipped with the mobile relay station 2a. Furthermore, the storage unit 261 stores in advance a weight (weighting factor) for each transmission time of the base station downlink signal transmitted from each antenna 25. This weight is used for a MIMO operation or beamforming. The weight for each transmission time is calculated on the basis of the orbit information of the LEO satellite and the position of each antenna station 410 included in the base station 4a. Note that a constant weight may be used regardless of the transmission time.

The control unit 262 controls the transmission data modulation unit 263 and the MIMO transmission unit 264 to transmit the received waveform information to the base station 4a at the transmission timing derived for the base station downlink signal. Furthermore, the control unit 262 instructs the MIMO transmission unit 264 on the weight for each transmission time read from the storage unit 261. The transmission data modulation unit 263 reads the received waveform information from the data storage unit 23 as transmission data, converts the read transmission data into a parallel signal, and then modulates the received waveform information. The MIMO transmission unit 264 performs weighting on the modulated parallel signal by the weight instructed by the control unit 262. The MIMO transmission unit 264 generates the base station downlink signal transmitted from each antenna 25 on the basis of the result of weighting executed. The MIMO transmission unit 264 transmits the generated base station downlink signal from the antenna 25 using MIMO. The MIMO transmission unit 264 may receive the base station uplink signal by MIMO.

The base station 4a includes a plurality of antenna stations 410, a MIMO reception unit 420, a base station signal reception processing unit 430, a terminal signal reception processing unit 44, and a communication state measurement unit 423. The communication state measurement unit 423 includes a storage unit 45, a dense area analysis unit 46, a base station signal transmission processing unit 47, and a transmission unit 48. The communication state measurement unit 423 may include a terminal signal reception processing unit 44. That is, the communication state measurement unit 423 may include a terminal signal decoding unit. Note that at least some of the functions of the dense area analysis unit 46 may be mounted not on the base station 4a side but on the mobile relay station 2a side.

The antenna station 410 is arranged at a position away from the other antenna stations 410 so as to increase the arrival angle difference of each radio signal transmitted from the plurality of antennas 25 of the mobile relay station 2a. Each antenna station 410 converts the base station downlink signal received from the mobile relay station 2a into an electrical signal and outputs the electrical signal to the MIMO reception unit 420.

The MIMO reception unit 420 aggregates the base station downlink signals received from the plurality of antenna stations 410. The MIMO reception unit 420 stores a weight for each reception time for the base station downlink signal received by each antenna station 410. The weight for each reception time is determined on the basis of the orbit information of the LEO satellite and the position of each antenna station 410. The MIMO reception unit 420 multiplies the base station downlink signal input from each antenna station 410 by a weight corresponding to the reception time of the base station downlink signal to combine the received signals multiplied by the weight. Note that the same weight may be used regardless of the reception time. The base station signal reception processing unit 430 obtains received waveform information from the received signal (baseband signal) converted into the electrical signal by the MIMO reception unit 420. The base station signal reception processing unit 430 outputs the received waveform information to the terminal signal reception processing unit 44.

The base station 4a estimates the density degree of the terminal station 3 (congestion degree of communication) by the method illustrated in (1) described below.

(1) A plurality of small areas that divides the communication target area is allocated in advance to the communication target area on the ground. The area size of each small area is, for example, the same. Each terminal station 3 notifies the mobile relay station 2a of the position information of the local terminal station by a terminal uplink signal or the like. The mobile relay station 2a transmits the waveform data to the base station 4a. The base station 4a obtains the position information of the terminal by decoding the waveform data using the terminal signal decoding unit 442. The dense area analysis unit 46 reports the upper limit value based on the obtained position information (density degree of terminal station) through the uplink communication to the mobile relay station 2a. If the terminal signal decoding unit is provided in the mobile relay station 2a, the mobile relay station 2a may obtain the position information of the terminal using the terminal signal decoding unit. The dense area analysis unit 46 counts the number of terminal stations 3 for each small area on the basis of the position information of the plurality of terminal stations 3. The dense area analysis unit 46 accumulates (records) the density degree of a group of terminal stations 3 in the storage unit for each small area. The dense area analysis unit 46 reports the density degree of the group of terminal stations 3 for each position of the group of terminal stations 3 by uplink communication to the mobile relay station 2a.

Figure 7:
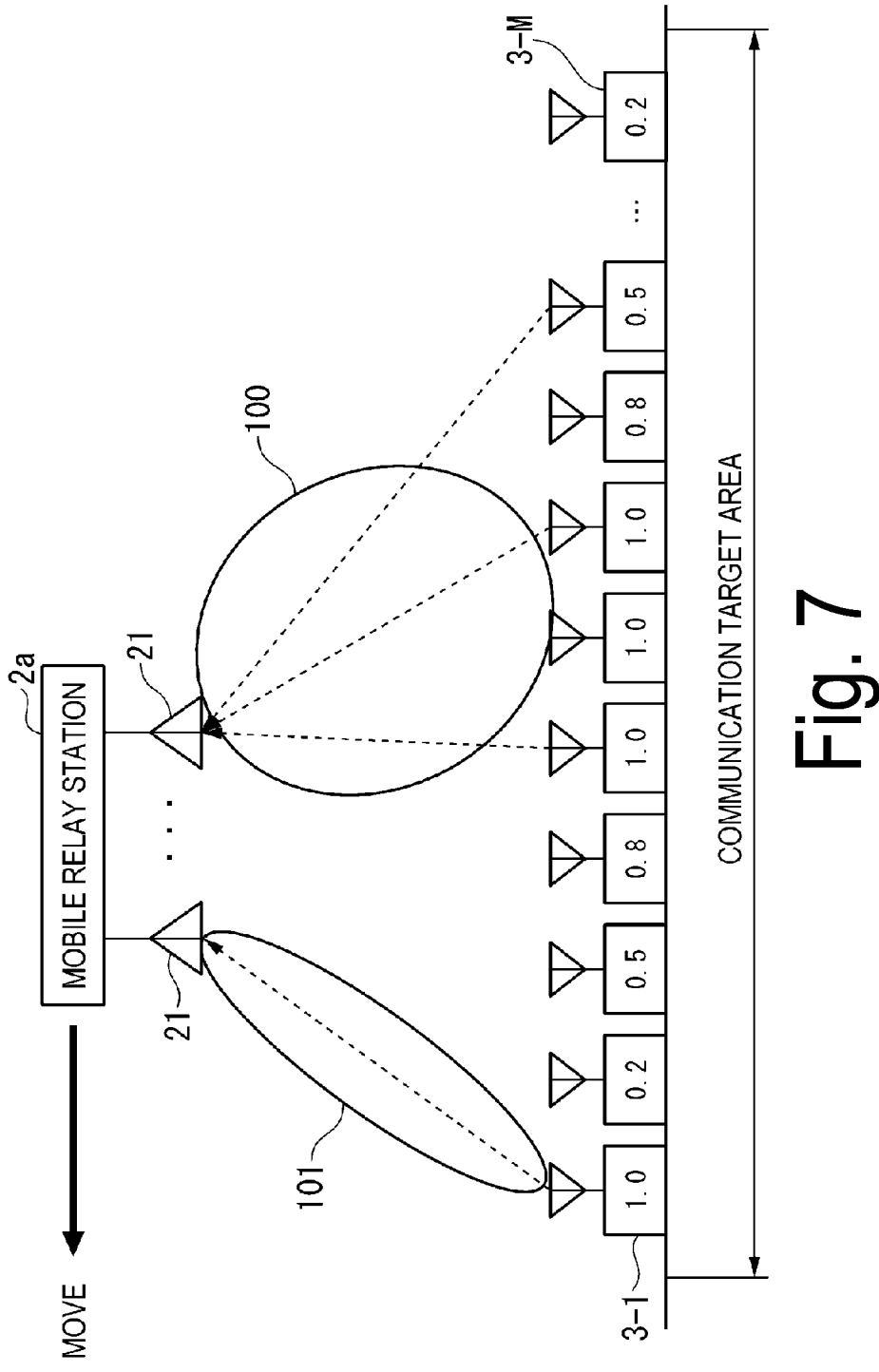
FIG. 7 is a diagram illustrating an example of a relationship between a position of a mobile relay station with respect to each terminal station and a variable value based on a reception level of a transmission permission signal in a specific terminal station according to the second embodiment.

FIG. 7 is a diagram illustrating an example of a relationship between a position of a mobile relay station 2a with respect to each terminal station 3 and a variable value (subtraction value) based on a reception level of a transmission permission signal in a specific terminal station 3 according to the second embodiment.

In a specific area such as an urban area, the density degree of the terminal stations 3 may be high. If the area where the density degree of the terminal station 3 is equal to or higher than the predetermined threshold is in the communication target area on the ground in the moving direction (forward) of the mobile relay station 2a, the mobile relay station 2a starts data collection from the terminal station 3 in the area where the density degree of the terminal station 3 is equal to or higher than the predetermined threshold from a timing earlier than the timing of data collection from the terminal station 3 in the area where the density degree of the terminal station 3 is lower than the threshold. That is, when the elevation angle of the mobile relay station 2a is small, the mobile relay station 2a starts the data collection from the terminal station 3.

In FIG. 7, a terminal station located in an urban area is, in one example, a terminal station 3-1. The mobile relay station 2a directs a beam 101 (transmission beam) toward an area where the density degree of the terminal station 3 is high. In addition, the mobile relay station 2a controls the transmission level of the transmission permission signal so that the reception level of the transmission permission signal in the terminal station 3-1 in the area becomes equal to or higher than a predetermined level. As a result, the terminal station 3-1 transmits the terminal uplink signal to the mobile relay station 2a when the elevation angle of the mobile relay station 2a is small as viewed from the terminal station 3-1.

When the elevation angle of the mobile relay station 2a is small, the mobile relay station 2a starts the data collection from the terminal station 3.

Each terminal station 3 sets the subtraction value to a larger value as the reception level of the transmission permission signal transmitted from the antenna 21 using the beam 100 or the beam 101 is higher. The beam 101 is a beam sharper (narrower beam) than the beam 100. The value described in each terminal station 3 illustrated in FIG. 7 represents an example of the subtraction value. For example, the subtraction value of the terminal station 3-1 is "1.0" in one example.

As described above, in the wireless communication system 1 according to the second embodiment, the transmission unit 226 (first transmission unit) or the timing control unit 224 controls a direction of the beam 101 of the transmission permission signal and the transmission level of the transmission permission signal such that the reception level of the transmission permission signal becomes equal to or higher than a predetermined level in the group of terminal stations 3 including the terminal station 3-1 in an area in which density degree of the terminal stations is equal to or higher than a predetermined threshold in a case where an area in which the density degree of the group of terminal stations 3 including the terminal station 3-1 is equal to or higher than a predetermined threshold is in the communication target area on the ground in a moving direction of the mobile relay station 2a. As a result, even if the plurality of terminal stations 3 are dense in an urban area or the like, the wireless communication system 1 can disperse the transmission timings of the plurality of terminal stations in the urban area or the like in terms of time and reduce the transmission probability at the same timing by starting data collection when the elevation angle of the mobile relay station 2a is small, so that it is possible to suppress a decrease in communication reliability.

In addition, the mobile relay station 2a transmits a base station downlink signal by the plurality of antennas 25. As a result, the mobile relay station 2a can collectively transmit the data received from the plurality of terminal stations 3 and accumulated with good quality in a short time at a timing at which communication with the base station 4a is possible.

Third Embodiment

In the third embodiment, the base station estimates an area with high density degree of terminal stations on the basis of information indicating received signal strength per unit time. In the third embodiment, the mobile relay station uses multiple-input multiple-output (MIMO) to transmit the base station downlink signals. In the third embodiment, description will be given by focusing on the differences with the first embodiment and the second embodiment.

The base station 4a estimates the density degree of the terminal station 3 (congestion degree of communication) by the method illustrated in (2) described below.

(2) The dense area analysis unit 46 obtains information indicating the received signal strength per unit time and orbit information of the mobile relay station 2a from the storage unit 45. The dense area analysis unit 46 generates density degree information on the basis of the information indicating the received signal strength per unit time and the orbit information of the mobile relay station 2a. The dense area analysis unit 46 outputs the generated density degree information to the base station signal transmission processing unit 47.

The base station signal transmission processing unit 47 obtains the density degree information from the dense area analysis unit 46. The base station signal transmission processing unit 47 uses the density degree information as transmission data and modulates the transmission data. The base station signal transmission processing unit 47 controls the transmission unit 48 to transmit the dense area information to the mobile relay station 2a at the transmission start timing stored in the storage unit 45a.

The transmission unit 48 weights the modulated parallel signal by a weight, and generates a base station uplink signal configured with the transmission data indicating the density degree information. The transmission unit 48 transmits the generated base station uplink signal from the plurality of antenna stations 410 to the mobile relay station 2a using MIMO.

In this manner, the communication state measurement unit 423 measures the communication state of the terminal uplink communication from the plurality of terminal stations 3 in the plurality of reception units 221.

More specifically, the density degree information is generated as follows.

The base station 4a specifies a dense area (density degree) of the terminal station 3 on the basis of the received signal strength for each unit time measured. Note that the stronger the received signal strength per unit time is, the denser the terminal stations 3 are estimated to be in the reception direction of the antenna 21 of the mobile relay station 2a at the moment.

Note that, if there is only one reception antenna of the mobile relay station 2a, the mobile relay station 2a collectively receives the terminal uplink signals arriving from each terminal station 3 existing in an area with a radius of several hundred [km] on the ground, for example, due to the width of the half width of the reception antenna. Therefore, with only one reception antenna, it is difficult to estimate the terminal density degree for each area on the ground from the received signal strength. Therefore, the mobile relay station 2a forms a sharp reception beam (narrow beam) by a plurality of reception antennas.

Note that the sharp reception beam is formed as post-processing using the waveform data in the base station 4a, for example, by transmitting received waveform information (waveform data) obtained and recorded by the mobile relay station 2a using sampling to the base station 4a. By forming (sweeping) sharp reception beams in order in the direction of each area on the ground by the post-processing in the base station 4a and measuring the received signal strength obtained as a result of this reception beam processing, the terminal density degree for each area on the ground can be estimated.

Note that, as described above, in the measurement of the received signal strength, it is necessary to perform processing with a large amount of calculation that forms a sharp reception beam by repeatedly using waveform data at a certain time and performs measurement while sweeping each area on the ground. Furthermore, it is necessary to perform similar calculation processing at each time. Therefore, it is desirable that the received signal strength be measured in the base station 4a having more possibilities that there are extra calculation resources as compared with the mobile relay station 2a.

The base station communication unit 26 of the mobile relay station 2a receives a base station uplink signal by the plurality of antennas 25. The MIMO transmission unit 264 may receive the base station uplink signal by MIMO.

The MIMO reception unit 420 of the base station 4a aggregates the base station downlink signals received by the plurality of antenna stations 410. The MIMO reception unit 420 stores the weight for each reception time with respect to the base station downlink signal received by each antenna station 410 on the basis of the orbit information of the LEO satellite and the position of each antenna station 410. The MIMO reception unit 420 multiplies the base station downlink signal input from each antenna station 410 by a weight corresponding to the reception time of the base station downlink signal, and combines the received signals multiplied by the weight. The base station signal reception processing unit 430 demodulates and decodes the combined received signals to obtain received waveform information. The base station signal reception processing unit 430 outputs the received waveform information to the terminal signal reception processing unit 44.

The signal processing unit 441 of the terminal signal reception processing unit 44 analyzes the received waveform information and measures the received signal strength per unit time. Terminal signal decoding unit 442 records information indicating the received signal strength per unit time in the storage unit 45.

The storage unit 45 stores information indicating the received signal strength per unit time. In addition, the storage unit 45 stores the orbit information of the mobile relay station 2a in advance. In addition, the storage unit 45 stores the transmission start timing calculated in advance on the basis of the orbit information of the LEO satellite equipped with the mobile relay station 2a and the position of the base station 4a.

The dense area analysis unit 46 obtains the information indicating the received signal strength per unit time and the orbit information of the mobile relay station 2a from the storage unit 45. The dense area analysis unit 46 generates density degree information indicating a position of the terminal station 3 in the dense area on the basis of the information indicating the received signal strength per unit time and the orbit information of the mobile relay station 2a. In addition, the dense area analysis unit 46 generates an upper limit value based on the density degree information.

The base station signal transmission processing unit 47 obtains the upper limit value based on the density degree information from the dense area analysis unit 46. The base station signal transmission processing unit 47 uses the upper limit value based on the density degree information as transmission data and modulates the transmission data. The base station signal transmission processing unit 47 controls the transmission unit 48 to transmit the upper limit value based on the density degree information to the mobile relay station 2a at the transmission start timing stored in the storage unit 45.

The transmission unit 48 weights the modulated parallel signal by a weight, and generates a base station uplink signal configured with the transmission data indicating the upper limit value transmitted from each antenna 25. The transmission unit 48 transmits the generated base station uplink signal from the plurality of antenna stations 410 to the mobile relay station 2a using MIMO.

An operation of the wireless communication system 1a is now described.

The processing of the wireless communication system 1a in a case where the terminal uplink signal is transmitted from the terminal station 3 is similar to the processing of the wireless communication system 1 of the first embodiment illustrated in FIG. 3.

Figure 8:
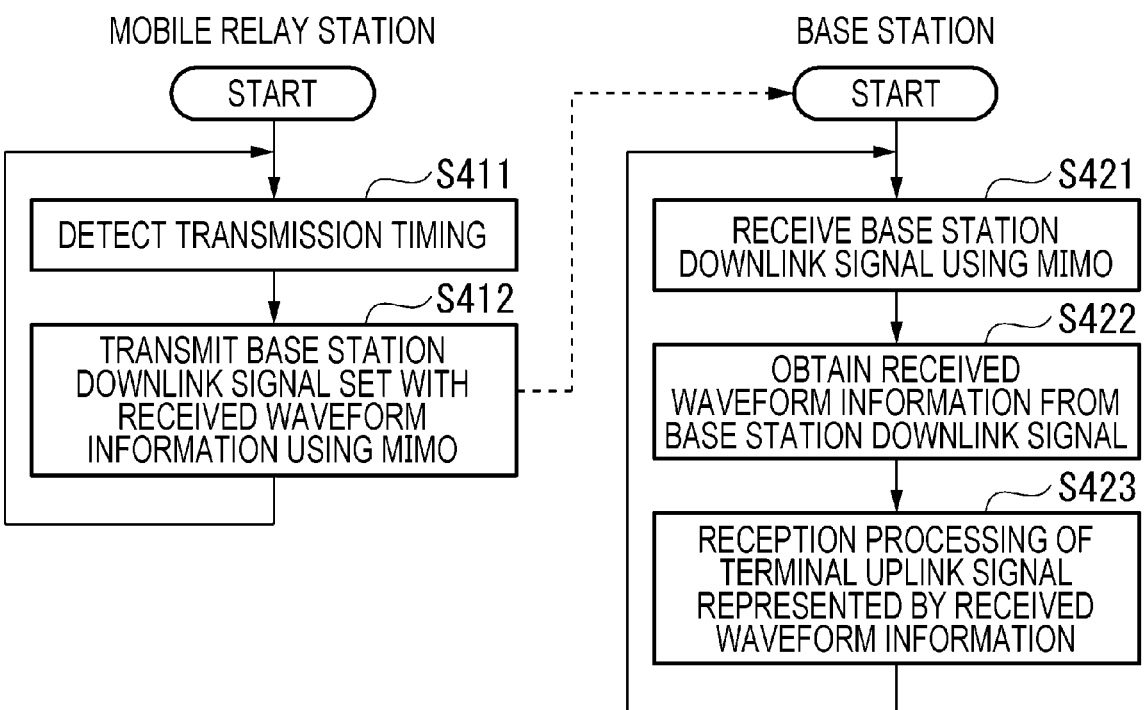
FIG. 8 is a flowchart illustrating data collection processing of the wireless communication system according to a third embodiment.

FIG. 8 is a flowchart illustrating processing of the wireless communication system 1a in a case where a base station downlink signal is transmitted from the mobile relay station 2a. When detecting that the transmission timing derived for the base station downlink signal is the current time, the control unit 262 included in the base station communication unit 26 of the mobile relay station 2a instructs the transmission data modulation unit 263 and the MIMO transmission unit 264 to transmit the received waveform information (step S411). The transmission data modulation unit 263 reads the received waveform information accumulated in the data storage unit 23 as transmission data, converts the read transmission data into a parallel signal, and then modulates the transmission data. The MIMO transmission unit 264 weights the transmission data modulated by the transmission data modulation unit 263 by the weight instructed by the control unit 262, and generates the base station downlink signal that is a transmission signal transmitted from each antenna 25. The MIMO transmission unit 264 transmits each of the generated base station downlink signals from the antenna 25 by MIMO (step S412). The mobile relay station 2a repeats the processing from step S411.

Each antenna station 410 of the base station 4a receives the base station downlink signal from the mobile relay station 2a (step S421). Each antenna station 410 outputs, to the MIMO reception unit 420, a received signal obtained by converting the received base station downlink signal into an electrical signal. The MIMO reception unit 420 synchronizes the timing of the received signal received by each antenna station 410. The MIMO reception unit 420 multiplies the weight to be added to the received signal received by each antenna station 410. The base station signal reception processing unit 430 obtains received waveform information from the received signal (baseband signal) converted into the electrical signal by the MIMO reception unit 420 (step S422). The base station signal reception processing unit 430 outputs the received waveform information obtained to the terminal signal reception processing unit 44.

The terminal signal reception processing unit 44 performs reception processing of the terminal uplink signal represented by the waveform data included in the received waveform information by processing similar to step S223 in the processing step of the first embodiment illustrated in FIG. 4 (step S423). That is, the signal processing unit 441 specifies the wireless communication scheme used by the terminal station 3 to transmit the terminal uplink signal on the basis of the information specific to the wireless communication scheme included in the received signal represented by the waveform data. The signal processing unit 441 obtains a symbol by performing frame detection, Doppler shift compensation, offline beam control, and the like on the received signal (baseband signal) represented by the waveform data according to the specified wireless communication scheme. The signal processing unit 441 outputs the obtained symbol to the terminal signal decoding unit 442. The terminal signal decoding unit 442 decodes the symbol input from the signal processing unit 441 according to the specified wireless communication scheme, and obtains the terminal transmission data transmitted from terminal station 3. Note that the terminal signal decoding unit 442 can also use a decoding method with a large calculation load, such as SIC. The base station 4a repeats the processing from step S421.

As described above, in the wireless communication system 1a according to the third embodiment, the dense area where the terminal stations 3 densely exist is estimated on the basis of the received signal strength of the terminal uplink signal for each unit time. As a result, the wireless communication system 1a can suppress a decrease in communication reliability even when a plurality of terminal stations 3 are densely located in an urban area or the like.

Fourth Embodiment

In the fourth embodiment, the base station estimates an area with high density degree of terminal stations on the basis of information indicating the number of received signals (the number of terminal uplink signals) per unit time. In the fourth embodiment, description will be given by focusing on the differences with each embodiment from the first embodiment to the third embodiment.

The base station 4a estimates the density degree of the terminal station 3 (congestion degree of communication) by the method illustrated in (3) described below.

(3) The dense area analysis unit 46 obtains the information indicating the number of received signals (the number of terminal uplink signals) per unit time and the orbit information of the mobile relay station 2a from the storage unit 45. The dense area analysis unit 46 generates density degree information of the terminal station 3 on the basis of the information indicating the number of received signals per unit time and the orbit information of the mobile relay station 2a. The dense area analysis unit 46 outputs an upper limit value based on the density degree information to the base station signal transmission processing unit 47.

The base station signal transmission processing unit 47 obtains the upper limit value based on the density degree information from the dense area analysis unit 46. The base station signal transmission processing unit 47 uses the upper limit value based on the density degree information as transmission data and modulates the transmission data. The base station signal transmission processing unit 47 controls the transmission unit 48 to transmit the upper limit value based on the density degree information to the mobile relay station 2a at the transmission start timing stored in the storage unit 45.

The transmission unit 48 weights the modulated parallel signal by a weight, and generates a base station uplink signal including an upper limit value. The transmission unit 48 transmits the generated base station uplink signal from the plurality of antenna stations 410 to the mobile relay station 2a using MIMO.

In this manner, the communication state measurement unit 423 measures the communication state of the terminal uplink communication from the plurality of terminal stations 3 in the plurality of reception units 221.

More specifically, the density degree information is generated as follows.

The base station 4a specifies a dense area (density degree) of the terminal station 3 on the basis of the number of the received signals per unit time measured. Note that the more the number of the received signals per unit time is, the denser the terminal stations 3 are estimated to be in the reception direction of the antenna 21 of the mobile relay station 2a at the moment.

Note that, if there is only one reception antenna of the mobile relay station 2a, the mobile relay station 2a collectively receives the terminal uplink signals arriving from each terminal station 3 existing in an area with a radius of several hundred [km] on the ground, for example, due to the width of the half width of the reception antenna. Therefore, with only one reception antenna, it is difficult to estimate the terminal density degree for each area on the ground from the number of the received signals. Therefore, the mobile relay station 2a forms a sharp reception beam (narrow beam) by a plurality of reception antennas.

Note that the sharp reception beam is formed as post-processing using the waveform data in the base station 4a, for example, by transmitting received waveform information (waveform data) obtained and recorded by the mobile relay station 2a using sampling to the base station 4a. By forming (sweeping) sharp reception beams in order in the direction of each area on the ground by the post-processing in the base station 4a and measuring the number of the received signals obtained as a result of this reception beam processing, the terminal density degree for each area on the ground can be estimated.

Note that, as described above, in the measurement of the number of the received signals, it is necessary to perform processing with a large amount of calculation that forms a sharp reception beam by repeatedly using waveform data at a certain time and performs measurement while sweeping each area on the ground. Furthermore, it is necessary to perform similar calculation processing at each time. Therefore, it is desirable that the number of terminals be measured in the base station 4a having more possibilities that there are extra calculation resources as compared with the mobile relay station 2a.

The base station communication unit 26 of the mobile relay station 2a receives a base station uplink signal by the plurality of antennas 25. The MIMO transmission unit 264 may receive the base station uplink signal by MIMO.

The MIMO reception unit 420 of the base station 4a aggregates the base station downlink signals received by the plurality of antenna stations 410. The MIMO reception unit 420 stores the weight for each reception time with respect to the base station downlink signal received by each antenna station 410 on the basis of the orbit information of the LEO satellite and the position of each antenna station 410. The MIMO reception unit 420 multiplies the base station downlink signal input from each antenna station 410 by a weight corresponding to the reception time of the base station downlink signal, and combines the received signals multiplied by the weight. The base station signal reception processing unit 430 demodulates and decodes the combined received signals to obtain received waveform information. The base station signal reception processing unit 430 outputs the received waveform information to the terminal signal reception processing unit 44.

The signal processing unit 441 of the terminal signal reception processing unit 44 analyzes the received waveform information and measures the number of the received signals per unit time. Terminal signal decoding unit 442 records information indicating the number of the received signals per unit time in the storage unit 45.

The storage unit 45 stores information indicating the number of the received signals per unit time. In addition, the storage unit 45 stores the orbit information of the mobile relay station 2a in advance. In addition, the storage unit 45 stores the transmission start timing calculated in advance on the basis of the orbit information of the LEO satellite equipped with the mobile relay station 2a and the position of the base station 4a.

The dense area analysis unit 46 obtains the information indicating the number of the received signals per unit time and the orbit information of the mobile relay station 2a from the storage unit 45. The dense area analysis unit 46 generates density degree information indicating a position of the terminal station 3 in the dense area on the basis of the information indicating the number of the received signals per unit time and the orbit information of the mobile relay station 2a. In addition, the dense area analysis unit 46 generates an upper limit value based on the density degree information.

The base station signal transmission processing unit 47 obtains the upper limit value based on the density degree information from the dense area analysis unit 46. The base station signal transmission processing unit 47 uses the upper limit value based on the density degree information as transmission data and modulates the transmission data. The base station signal transmission processing unit 47 controls the transmission unit 48 to transmit the upper limit value based on the density degree information to the mobile relay station 2a at the transmission start timing stored in the storage unit 45.

The transmission unit 48 weights the modulated parallel signal by a weight, and generates a base station uplink signal configured with the transmission data indicating the upper limit value transmitted from each antenna 25. The transmission unit 48 transmits the generated base station uplink signal from the plurality of antenna stations 410 to the mobile relay station 2a using MIMO.

As described above, in the wireless communication system 1a according to the fourth embodiment, the dense area where the terminal stations 3 densely exist is estimated on the basis of the number of the received signals (the number of the terminal uplink signals) per unit time. As a result, the wireless communication system 1 can suppress a decrease in communication reliability even when a plurality of terminal stations 3 are densely located in an urban area or the like.

Fifth Embodiment

In the fifth embodiment, instead of the terminal station adjusting the subtraction value according to the reception level of the transmission permission signal, the mobile relay station notifies the terminal station in each area of the subtraction value for each area in a time division manner. Hereinafter, description will be given by focusing on the differences with each embodiment from the first embodiment to the fourth embodiment.

Figure 9:
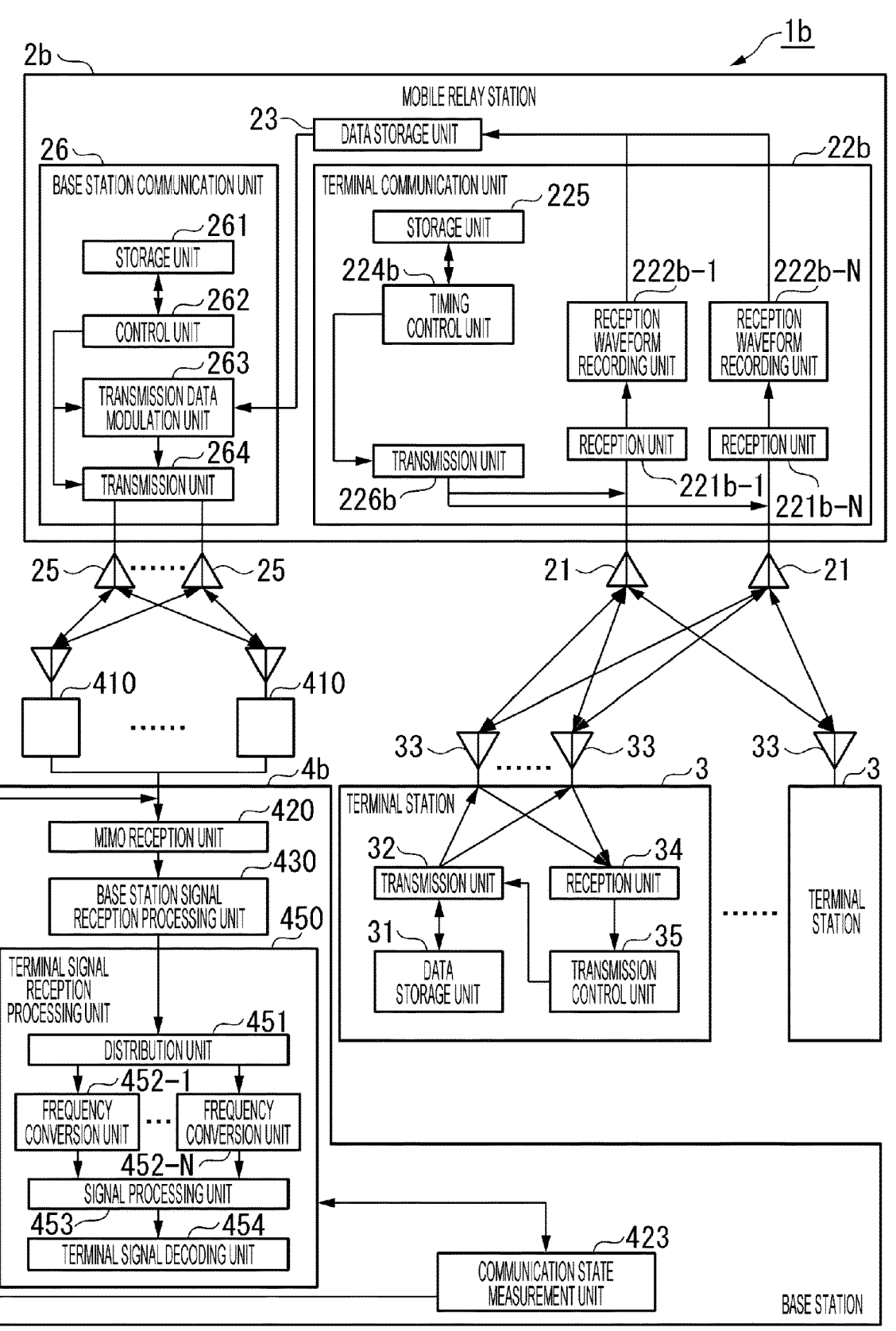
FIG. 9 is a configuration diagram of the wireless communication system according to a fifth embodiment.

FIG. 9 is a configuration diagram of a wireless communication system 1b according to the fifth embodiment. In the drawing, the same configurations as those of the wireless communication system 1a according to the second embodiment illustrated in FIG. 6 are assigned with the same reference numerals as those used in FIG. 6, and explanation thereof is not made herein. The wireless communication system 1b includes a mobile relay station 2b, a terminal station 3, and a base station 4b.

The mobile relay station 2b includes N antennas 21 (N is an integer of two or more), a terminal communication unit 22b, a data storage unit 23, a base station communication unit 26, and a plurality of antennas 25. The N antennas 21 are referred to as antennas 21-1 to 21-N, respectively.

The terminal communication unit 22b includes N reception units 221b and N reception waveform recording units 222b. The N reception units 221b are referred to as reception units 221b-1 to 221b-N, and the N reception waveform recording units 222b are referred to as reception waveform recording units 222b-1 to 222b-N. The reception unit 221b-n (n is an integer of one or more and N or less) receives the terminal uplink signal through the antenna 21-n. The reception waveform recording unit 222b-n samples the received waveform of the terminal uplink signals received by the reception unit 221b-n and generates waveform data indicating a value obtained by the sampling. The reception waveform recording unit 222b-n writes, in the data storage unit 23, the received waveform information including the antenna identifier of the antenna 21-*n*, the reception time of the terminal uplink signal in the antenna 21-*n*, and the generated waveform data. The antenna identifier is information for specifying the antenna 21-*n*. The data storage unit 23 stores the received waveform information including the waveform data of the terminal uplink signal received by each of the antennas 21-1 to 21-N.

The base station 4*b* includes a plurality of antenna stations 410, a MIMO reception unit 420, a base station signal reception processing unit 430, a terminal signal reception processing unit 450, and a communication state measurement unit 423.

The terminal signal reception processing unit 450 performs reception processing of the terminal uplink signal indicated by the received waveform information. At this time, the terminal signal reception processing unit 450 performs reception processing according to the wireless communication scheme used for transmission by the terminal station 3 to obtain terminal transmission data. The terminal signal reception processing unit 450 includes a distribution unit 451, N frequency conversion units 452, a signal processing unit 453, and a terminal signal decoding unit 454. The N frequency conversion units 452 are referred to as frequency conversion units 452-1 to 452-N, respectively.

The distribution unit 451 reads the waveform data of the same reception time from the received waveform information, and outputs the read waveform data to the frequency conversion units 452-1 to 452-N according to the antenna identifier associated with the waveform data. That is, the distribution unit 451 outputs the waveform data associated with the antenna identifier of the antenna 21-*n* to the frequency conversion unit 452-*n*. Each of the frequency conversion units 452-1 to 452-N executes frequency conversion processing on the signal represented by the waveform data. The frequency conversion units 452-1 to 452-N output the respective baseband signals obtained to the signal processing unit 453.

The signal processing unit 453 executes processing such as frame detection (detection of a terminal uplink signal), Doppler shift compensation, and offline beam control on each baseband signal. The frame detection is processing of detecting a section including a terminal transmission signal (a frame of the terminal uplink signal) from the waveform data. The offline beam control is reception beam control which is not performed by the mobile relay station 2*b*, but performed by the base station as post-processing in which the recorded waveform data is transmitted to the base station.

The signal processing unit 453 may perform the frame detection on the signal represented by the waveform data after performing the processing of compensating for the Doppler shift of the terminal uplink signal received by the antenna 21 of the mobile relay station 2*b*. The Doppler shift received by the terminal uplink signal received by each antenna 21 is derived in advance on the basis of the position of the terminal station 3 and orbit information of the LEO on which the mobile relay station 2*b* is mounted.

In the offline beam control, the signal processing unit 453 adds and synthesizes the respective baseband signals multiplied by the weights for amplitude correction and phase correction so that the baseband signals (terminal uplink signals received in the respective receiving systems) input from the frequency conversion units 452-1 to 452-N are intensified and combined with each other. As a result, the signal processing unit 453 obtains a symbol. Note that the signal processing unit 453 may simply add and synthesize the baseband signals input from the frequency conversion units 452-1 to 452-N. The signal processing unit 453 outputs the symbol to the terminal signal decoding unit 454. The Terminal signal decoding unit 454 decodes the symbol to obtain terminal transmission data transmitted from terminal station 3.

Further, as illustrated in FIG. 9, the mobile relay station 2*b* further includes a timing control unit 224*b*, a storage unit 225, and a transmission unit 226*b*.

The base station 4*b* may obtain the position information of the terminal for each small area of the communication target area. The base station 4*b* may measure the received signal strength of the terminal uplink signal for each small area of the communication target area. The base station 4*b* may measure the number of the terminal uplink signals (the number of received signals) for each small area of the communication target area. The base station 4*b* transmits the upper limit value in uplink communication to the mobile relay station 2*b*.

The timing control unit 224*b* controls the timing of transmitting the terminal downlink signal including the transmission permission signal to the terminal station 3. The timing control unit 224*b* obtains the upper limit value generated by the communication state measurement unit 423. The timing control unit 224*b* generates a transmission permission signal including the obtained upper limit value.

The transmission unit 226*b* obtains the transmission permission signal generated by the timing control unit 224*b*, and transmits the terminal downlink signal including the obtained transmission permission signal from the plurality of antennas 21 by a radio signal. The transmission unit 226*b* determines a channel to be used for transmission of a terminal downlink signal by the local station by a method determined in advance in the wireless communication scheme to be used. The timing at which the transmission unit 226*b* transmits the terminal downlink signal is controlled by the timing control unit 224*b*.

The storage unit 225 may store, for each terminal station 3, a predicted value of the transmission timing derived in advance in the terminal station 3 on the basis of the reception level of the transmission permission signal transmitted from the LEO satellite equipped with the mobile relay station 2*b*. In addition, the upper limit value may be updated on the basis of the predicted value of the transmission timing of each terminal station 3.

In addition, the storage unit 225 stores in advance terminal identification information for identifying the terminal station 3 and position information indicating the position of the terminal station 3. The timing control unit 224*b* may specify the terminal identification information of the terminal station 3 to be notified of the transmission permission signal on the basis of the current position of the local station and the current position of the terminal station 3. The timing control unit 224*b* includes the specified terminal identification information in the transmission permission signal.

In addition, as illustrated in FIG. 9, the terminal station 3 further includes a reception unit 34 and a transmission control unit 35. The reception unit 34 receives the terminal downlink signal using the antenna 33. The transmission control unit 35 obtains a transmission permission signal from the terminal downlink signal received by the reception unit 34. Note that the transmission control unit 35 may obtain terminal identification information included in the extracted transmission permission signal. If the obtained terminal identification information is identification information associated with the local terminal station, the transmission control unit 35 may extract information of the upper limit value from the transmission permission signal. If the obtained terminal identification information is not the identification information associated with the local terminal station of the transmission control unit 35, the terminal station 3 may suspend the transmission of the terminal uplink signal to the mobile relay station 2b.

The transmission control unit 35 determines the number of times of repeatedly transmitting the same terminal uplink signal to the mobile relay station 2b on the basis of the obtained upper limit value.

The transmission unit 32 starts transmitting the terminal uplink signal. The transmission unit 32 reads the sensor data as terminal transmission data from the data storage unit 31, and transmits a terminal uplink signal including the read terminal transmission data from the antenna 33 by a radio signal. The transmission unit 32 transmits a signal by the LPWA, for example. In addition, the transmission unit 32 repeatedly transmits the same terminal uplink signal for the number of times of transmission determined by the transmission control unit 35.

The reception units 221b-1 to 221b-N receive the terminal uplink signals using the plurality of antennas 21. The reception waveform recording unit 222 samples the received waveform of the terminal uplink signals received by the reception units 221b-1 to 221b-N and generates waveform data indicating a value obtained by the sampling. Since each sensor data is transmitted a plurality of times in the terminal station 3, a plurality of pieces of waveform data corresponding to the same terminal uplink signal is to be generated.

The reception waveform recording units 222b-1 to 222b-N select, for example, waveform data having the best reception state from the plurality pieces of waveform data corresponding to the same terminal uplink signal. The reception waveform recording units 222b-1 to 222b-N write, in the data storage unit 23, the received waveform information including the reception time of the terminal uplink signal in the antenna 21 and the selected waveform data. The data storage unit 23 stores the received waveform information written by the reception waveform recording units 222b-1 to 222b-N. Note that the reception waveform recording units 222b-1 to 222b-N may write, into the data storage unit 23, for example, received waveform information including waveform data generated by averaging the plurality pieces of waveform data corresponding to the same terminal uplink signal.

Figure 10:
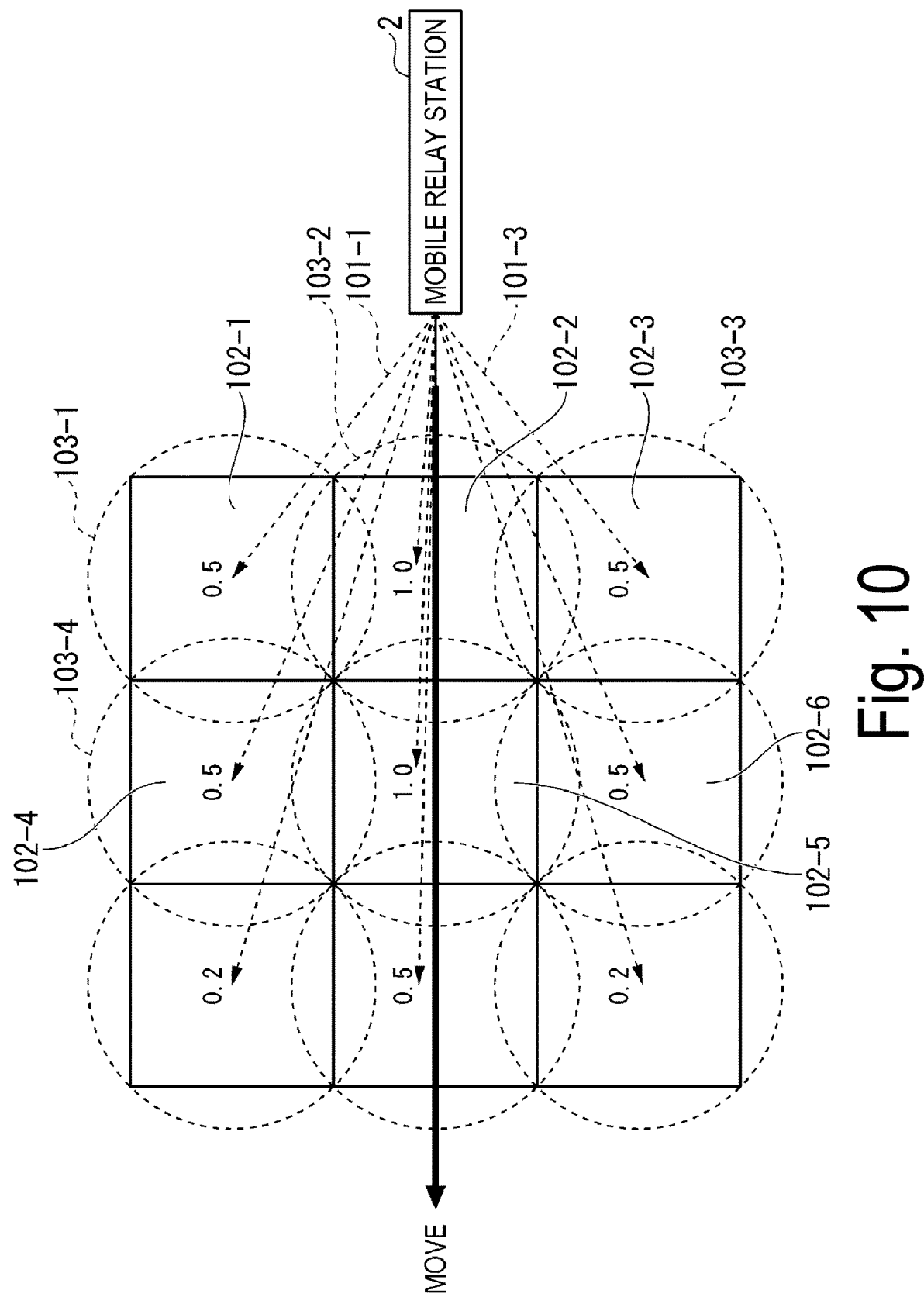
FIG. 10 is a diagram of a communication target area on the ground as viewed from a mobile relay station moving in the sky near the communication target area according to the fifth embodiment.

FIG. 10 is a diagram of a communication target area on the ground as viewed from the mobile relay station 2b moving in the sky near the communication target area. In FIG. 10, the communication target area is divided into a plurality of small areas 102. In FIG. 10, the shape of the small area 102 is, for example, a rectangle. An irradiation range 103 represents the irradiation range of a beam 101 with which the small area 102 is irradiated.

The mobile relay station 2b determines the subtraction value to be larger as the elevation angle of the mobile relay station 2b is larger. For example, the mobile relay station 2b sets the subtraction value used by the terminal station 3 located in the small area 102-2 to "1.0". Similarly, the mobile relay station 2b sets the subtraction value used by the terminal station 3 located in the small area 102-5 to "1.0".

The mobile relay station 2b notifies each terminal station 3 in the small area 102 of the subtraction value in a time division manner for each small area 102 using a sharp transmission beam (narrow beam). For example, after notifying each terminal station 3 in the small area 102-1 of the subtraction value "0.5", each terminal station 3 in the small area 102-2 is notified of the subtraction value "1.0". As a result, it is possible to control the transmission probability of the terminal uplink signal for each small area 102.

Note that the terminal station 3 located near the boundary between the small areas 102 may be notified of a plurality of subtraction values. In this case, the terminal station 3 may update the backoff counter value to "x=x−w" by using any one of the plurality of notified subtraction values "w".

The value described in each small area 102 in FIG. 10 represents the subtraction value "w" notified by the mobile relay station 2b to each terminal station 3 in the small area 102. For example, the value "0.5" described in the small area 102-1 represents the subtraction value "0.5" notified to each terminal station 3 in the small area 102.

An operation of the wireless communication system 1b is now described.

Figure 11:
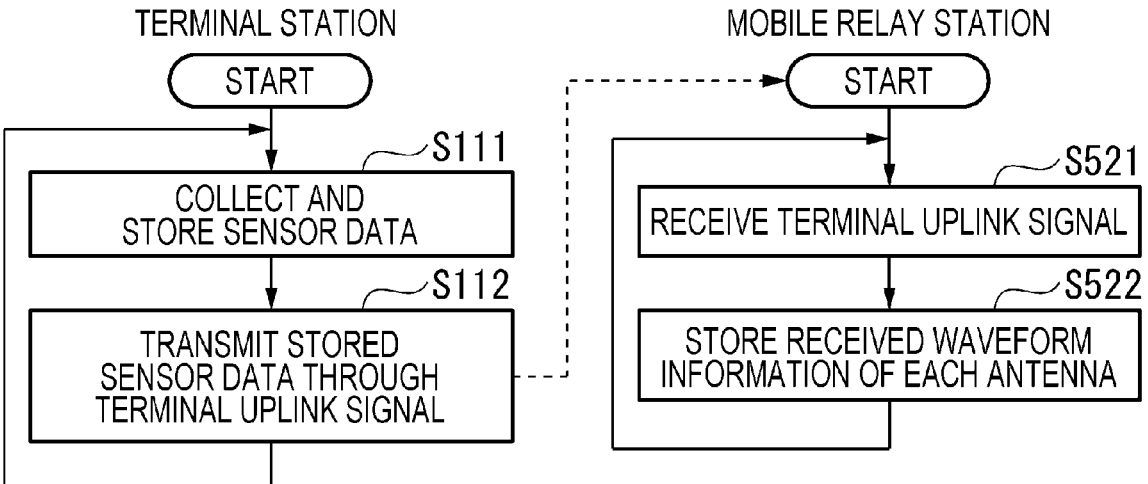
FIG. 11 is a flowchart illustrating data collection processing of the wireless communication system according to the fifth embodiment.

FIG. 11 is a flowchart illustrating processing of the wireless communication system 1b in a case where a terminal uplink signal is transmitted from the terminal station 3. In the drawing, the same processing steps as those of the first embodiment illustrated in FIG. 3 are assigned with the same reference numerals. The terminal station 3 performs processing similar to the processing of steps S111 to S112 in the processing steps of the first embodiment illustrated in FIG. 3. Note that the terminal station 3 may perform transmission with another terminal station 3 by time division multiplexing, OFDM, MIMO, or the like.

The reception units 221b-1 to 221b-N of the mobile relay station 2b receive the terminal uplink signal transmitted from the terminal station 3 (step S521). Depending on the wireless communication scheme of the transmission source terminal station 3, there are a case where the terminal uplink signal is received from only one terminal station 3 in a time division manner at the same frequency and a case where the terminal uplink signals are simultaneously received from a plurality of terminal stations 3 at the same frequency. The reception waveform recording unit 222b-n writes, in the data storage unit 23, the received waveform information in which the waveform data representing the waveform of the terminal uplink signal received by the reception unit 221b-n, the reception time, and the antenna identifier of the antenna 21-n are associated with each other (step S522). The mobile relay station 2b repeats the processing from step S521.

The processing of the wireless communication system 1b in a case of transmitting the base station downlink signal from the mobile relay station 2b is similar to the processing step of the third embodiment illustrated in FIG. 8 except for the following processing. That is, in step S423, the terminal signal reception processing unit 450 performs reception processing of the terminal uplink signal indicated by the received waveform information. Specifically, the distribution unit 451 reads the waveform data having the same reception time from the received waveform information, and outputs the read waveform data to the frequency conversion units 452-1 to 452-N according to the antenna identifier associated with the waveform data. The respective frequency conversion units 452-1 to 452-N specifies the wireless communication scheme used by the terminal station 3 to transmit the terminal uplink signal on the basis of the information specific to the wireless communication scheme included in the received signal represented by the waveform data. The frequency conversion units 452-1 to 452-N execute frequency conversion processing on the received signal represented by the waveform data according to the specified wireless communication scheme.

In the offline beam control, the signal processing unit 453 adds and synthesizes the respective baseband signals multiplied by the weights for amplitude correction and phase correction so that the baseband signals (terminal uplink signals received in the respective receiving systems) input from the frequency conversion units 452-1 to 452-N are intensified and combined with each other. As a result, the signal processing unit 453 obtains a symbol. Note that the signal processing unit 453 may simply add and synthesize the baseband signals input from the frequency conversion units 452-1 to 452-N. By the additive synthesis, the signal transmitted by the terminal station 3 is emphasized because of the correlation, but the influence of the noise randomly added is reduced. Therefore, the diversity effect can be obtained for the terminal uplink signal that the mobile relay station 2b simultaneously receives from only one terminal station 3. In addition, the terminal uplink signals simultaneously received by the mobile relay station 2b from the plurality of terminal stations 3 correspond to performing MIMO communication. The signal processing unit 453 outputs the symbol added and synthesized to the terminal signal decoding unit 454. The terminal signal decoding unit 454 decodes the symbol added and synthesized by the signal processing unit 453 using the specified wireless communication scheme. Accordingly, the terminal signal decoding unit 454 obtains terminal transmission data transmitted from terminal station 3. Note that the terminal signal decoding unit 454 can also use a decoding method with a large calculation load, such as SIC.

FIG. 12 is a flowchart illustrating processing of the wireless communication system 1b in a case where the terminal downlink signal is transmitted from the mobile relay station 2b. The communication state measurement unit 423 of the base station 4b measures the communication state of the terminal uplink communication from the plurality of terminal stations 3 in the reception units 221b-1 to 221b-N (step S611).

The communication state measurement unit 423 generates the upper limit value on the basis of the information measured using each reception unit 221b (step S612). The timing control unit 224b generates a transmission permission signal including terminal identification information of the terminal station 3 to which the transmission permission signal is to be notified and an upper limit value, and the subtraction value "x". The transmission unit 226b obtains the generated transmission permission signal and the subtraction value "x" from the timing control unit 224b. The transmission unit 226b transmits the terminal downlink signal including the obtained transmission permission signal and the subtraction value "x" from the plurality of antennas 21 by a radio signal (step S613). The mobile relay station 2b repeats the processing from step S611.

The reception unit 34 of the terminal station 3 receives the terminal downlink signal transmitted from the mobile relay station 2b using the antenna 33 (step S621). The transmission control unit 35 obtains the terminal identification information indicated by the terminal downlink signal received by the reception unit 34, the transmission permission signal, and the subtraction value "x" (step S622).

The reception unit 34 of the terminal station 3 receives the terminal downlink signal transmitted from the mobile relay station 2b using the antenna 33 (step S621). If the terminal identification information included in the transmission permission signal in the terminal downlink signal is the terminal identification information associated with the local station, the transmission control unit 35 extracts the subtraction value "w" from the terminal downlink signal. The transmission control unit 35 extracts the upper limit value from the transmission permission signal. The transmission control unit 35 derives a backoff counter value "x" of zero or more on the basis of the upper limit value extracted from the transmission permission signal. The backoff counter value "x" is a random number value with the extracted upper limit value as an upper limit (step S622). The transmission control unit 35 initializes a time counter "t" to "t=1" (step S623). The transmission control unit 35 subtracts the subtraction value "w" from the backoff counter value "x" based on the upper limit value. As a result, the transmission control unit 35 updates the backoff counter value to "x=x−w". That is, the transmission control unit 35 counts down the backoff counter (step S624).

The transmission control unit 35 determines whether or not the backoff counter value "x" is zero. Note that the transmission control unit 35 may determine whether or not the backoff counter value is zero or less (step S625). If it is determined that the backoff counter value "x" is not zero (step S625: No), the transmission control unit 35 updates the time counter "t" to "t+1" (step S626), and returns the process to step S624. If it is determined that the backoff counter value "x" is zero (step S625: Yes), the transmission control unit 35 transmits the terminal uplink signal using the antenna 21 (step S627).

The transmission unit 32 reads the sensor data from the data storage unit 31 as terminal transmission data, and transmits a terminal uplink signal including the read terminal transmission data from the antenna 33 by a radio signal. Here, the transmission unit 32 may transmit the same terminal uplink signal a plurality of times by the number of times of transmission determined by using the upper limit value (step S627). The terminal station 3 repeats the processing from step S621.

The transmission control unit 35 may return to processing of step S626 to step S621 at a predetermined cycle. In this case, in step S622 subsequent to step S621, the subtraction value does not need to be updated. That is, the subtraction value does not need to be extracted.

The reception units 221b-1 to 221b-N of the mobile relay station 2b receive the terminal uplink signal transmitted from the terminal station 3 a plurality of times using the plurality of antennas 21 (step S631). The reception waveform recording units 222b-1 to 222b-N sample the each received waveform of the plurality of terminal uplink signals received by the reception units 221b-1 to 221b-N and generate each waveform data indicating a value obtained by the sampling. The reception waveform recording units 222b-1 to 222b-N select, for example, waveform data having the best reception state from the plurality pieces of waveform data corresponding to the same terminal uplink signal (step S632). The reception waveform recording units 222b-1 to 222b-N record, in the data storage unit 23, the received waveform information including the reception time of the terminal uplink signal in each antenna 21 and the selected waveform data (step S633). The mobile relay station 2b repeats the processing from step S631.

As described above, according to the wireless communication system 1b of the fifth embodiment, the timing control unit 224b includes, in the transmission permission signal, the subtraction value "w" that makes the transmission timing of the terminal uplink signal earlier as the elevation angle of the mobile relay station 2b (relay device) viewed from the terminal station 3 (communication device) (communication apparatus) is larger. For example, the timing control unit 224b includes the subtraction value "w", which is a larger value as the elevation angle of the mobile relay station 2b is larger, in the transmission permission signal. Transmission unit 226b (first transmission unit) transmits the transmission permission signal including the subtraction value "w" to each small area 102 of the communication target area in a time division manner. For example, as illustrated in FIG. 12, the transmission control unit 35 determines the transmission timing on the basis of the subtraction value "w".

Accordingly, the wireless communication system 1*b* according to the fifth embodiment can suppress a decrease in communication reliability. In addition, the link budget of communication between the mobile relay station 2*b* and the terminal station 3 can be improved.

Further, the mobile relay station 2*b* may receive the terminal uplink signal transmitted from the terminal station 3 by diversity reception or the like.

First Modification of Fifth Embodiment

Figure 13:
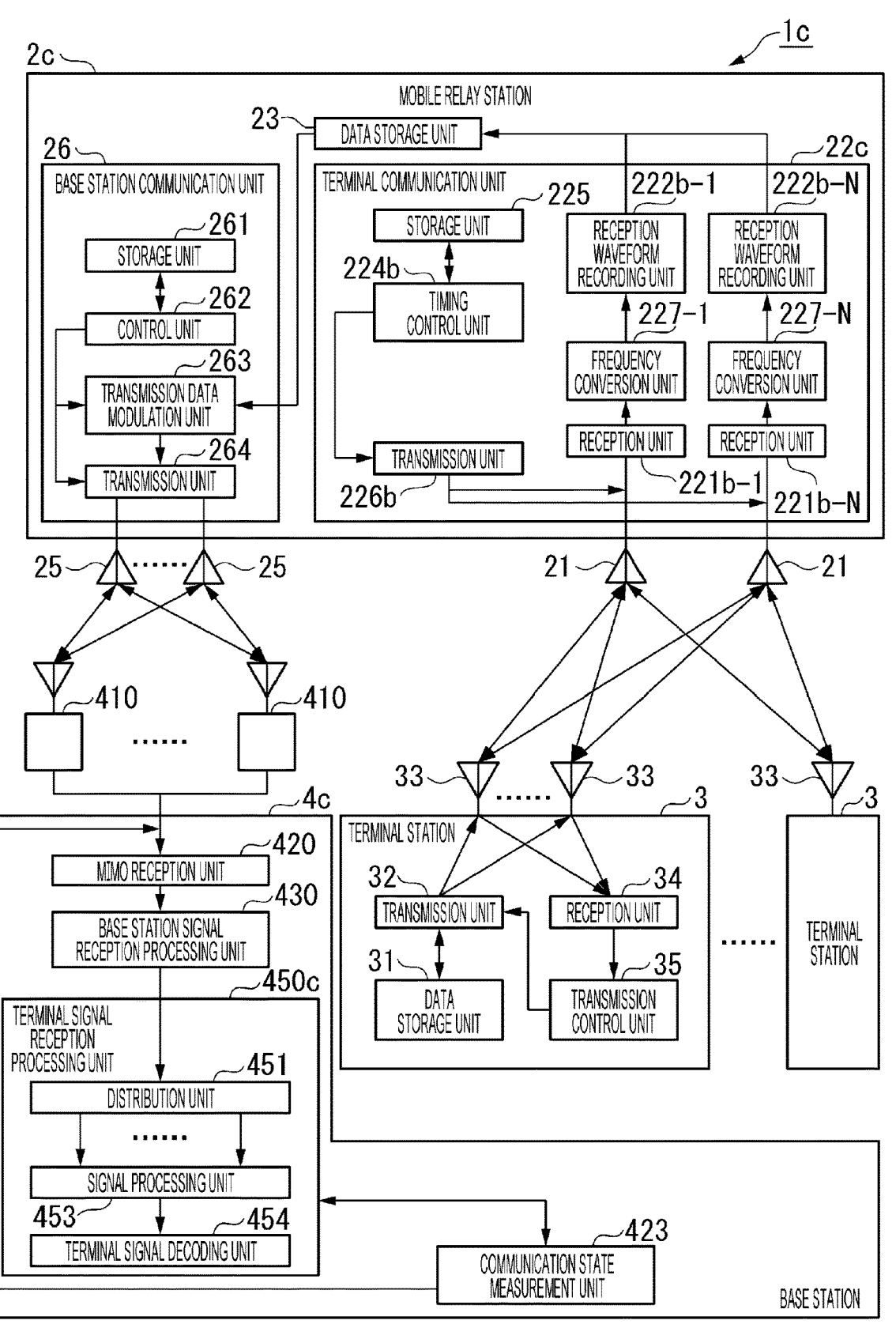
FIG. 13 is a configuration diagram of the wireless communication system according to a first modification of the fifth embodiment.

FIG. 13 is a configuration diagram of the wireless communication system according to a first modification of the fifth embodiment. One of the differences from the above-described embodiment is that a terminal communication unit 22*c* includes a frequency conversion unit. The same configurations as those of the wireless communication system 1*b* according to the second embodiment illustrated in FIG. 9 are assigned with the same reference numerals as those used in FIG. 9, and explanation thereof is not made herein.

A wireless communication system 1*c* includes a mobile relay station 2*c*, a terminal station 3, and a base station 4*c*. The mobile relay station 2*c* includes a terminal communication unit 22*c*, a data storage unit 23, and a base station communication unit 26.

The terminal communication unit 22*c* includes N reception units 221*b*, N reception waveform recording units 222*b*, a timing control unit 224*b*, a storage unit 225, a transmission unit 226*b*, and N frequency conversion units 227.

The N frequency conversion units 227 convert the terminal uplink signal into a baseband signal using a quadrature demodulator or the like. The reception waveform recording unit 222*b*-*n* samples the received waveform of the baseband signals generated by the frequency conversion unit 227-*n* and generates waveform data indicating a value obtained by the sampling.

The base station 4*c* includes a plurality of antenna stations 410, a MIMO reception unit 420, a base station signal reception processing unit 430, a terminal signal reception processing unit 450*c*, and a communication state measurement unit 423. The terminal signal reception processing unit 450*c* includes a distribution unit 451, a signal processing unit 453, and a terminal signal decoding unit 454.

The distribution unit 451 reads the waveform data of the same reception time from the received waveform information, and outputs the read waveform data to the signal processing unit 453 according to the antenna identifier associated with the waveform data. The signal processing unit 453 obtains a symbol by executing processing such as frame detection (detection of a terminal uplink signal), Doppler shift compensation, and offline beam control on the waveform data (baseband signal) input from the distribution unit 451.

Second Modification of Fifth Embodiment

Figure 14:
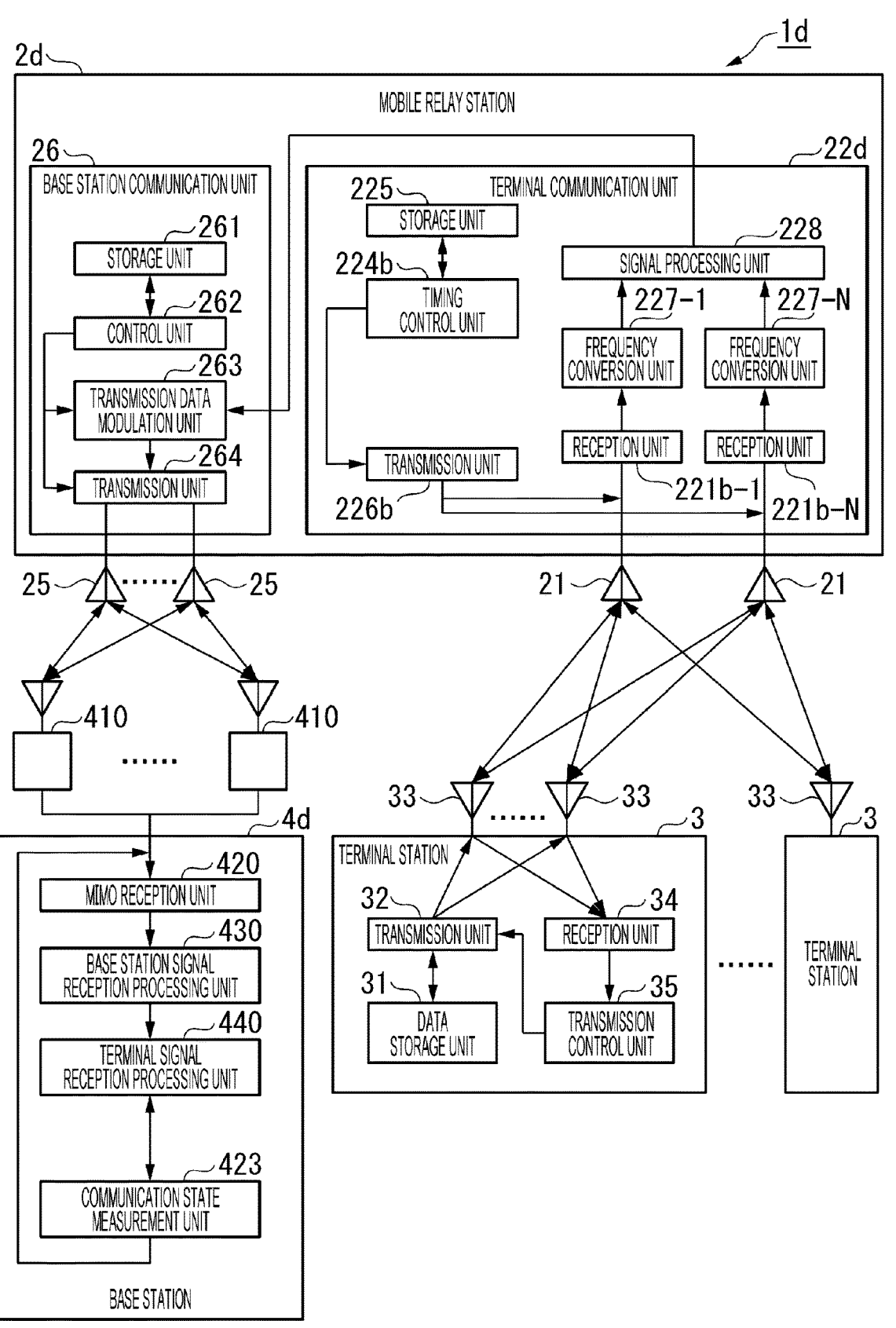
FIG. 14 is a configuration diagram of the wireless communication system according to a second modification of the fifth embodiment.

FIG. 14 is a configuration diagram of the wireless communication system according to a second modification of the fifth embodiment. One of the differences from the first modification of the fifth embodiment is that the terminal communication unit 22*c* includes a signal processing unit. Further, in FIG. 14, the mobile relay station 2*d* does not temporarily record the symbol, the mobile relay station 2*d* transmits the symbol to the base station, and the terminal signal reception processing unit of the base station decodes the symbol so that the base station obtains the terminal transmission data. The same configurations as those of the wireless communication system 1*c* according to the first modification of the fifth embodiment illustrated in FIG. 13 are assigned with the same reference numerals as those used in FIG. 13, and explanation thereof is not made herein.

A wireless communication system 1*d* includes a mobile relay station 2*d*, a terminal station 3, and a base station 4*d*. The mobile relay station 2*d* includes a terminal communication unit 22*d* and a base station communication unit 26. The terminal communication unit 22*d* includes N reception units 221*b*, a timing control unit 224*b*, a storage unit 225, a transmission unit 226*b*, N frequency conversion units 227, and a signal processing unit 228.

The frequency conversion unit 227 converts the terminal uplink signal into a baseband signal using a quadrature demodulator or the like. The signal processing unit 228 obtains a symbol by performing processing such as frame detection, Doppler shift compensation, reception beam control, and the like on the baseband signal. The signal processing unit 228 outputs the symbol to the transmission data modulation unit 263.

The base station 4*d* includes a plurality of antenna stations 410, a MIMO reception unit 420, a base station signal reception processing unit 430, a terminal signal reception processing unit 440, and a communication state measurement unit 423. The base station signal reception processing unit 430 obtains received waveform information from the received signal (baseband signal) converted into the electrical signal by the MIMO reception unit 420. The base station signal reception processing unit 430 outputs the received waveform information to the terminal signal reception processing unit 440. Terminal signal reception processing unit 440 decodes the symbol input from base station signal reception processing unit 430 to obtain terminal transmission data transmitted from terminal station 3.

Third Modification of Fifth Embodiment

Figure 15:
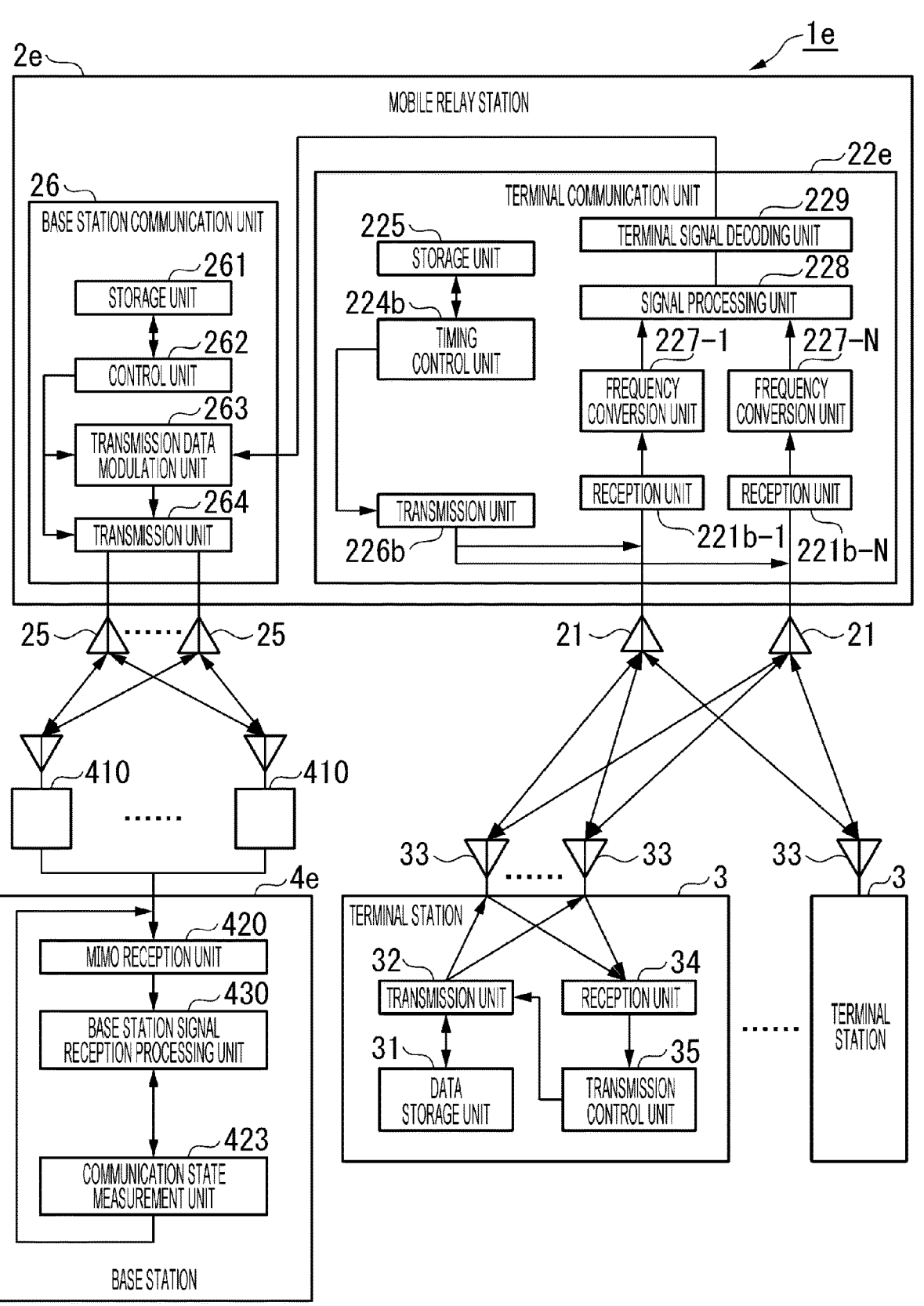
FIG. 15 is a configuration diagram of the wireless communication system according to a third modification of the fifth embodiment.

FIG. 15 is a configuration diagram of the wireless communication system according to a third modification of the fifth embodiment. One of the differences from the second modification of the fifth embodiment is that the terminal communication unit 22*e* includes a terminal signal decoding unit. The same configurations as those of the wireless communication system 1*d* according to the second modification of the fifth embodiment illustrated in FIG. 14 are assigned with the same reference numerals as those used in FIG. 14, and explanation thereof is not made herein.

A wireless communication system 1*e* includes a mobile relay station 2*e*, a terminal station 3, and a base station 4*e*. The mobile relay station 2*e* includes a terminal communication unit 22*e* and a base station communication unit 26. The terminal communication unit 22*e* includes N reception units 221*b*, a timing control unit 224*b*, a storage unit 225, a transmission unit 226*b*, N frequency conversion units 227, a signal processing unit 228, and a terminal signal decoding unit 229.

The signal processing unit 228 obtains a symbol by performing processing such as frame detection, Doppler shift compensation, reception beam control, and the like on the baseband signal. The signal processing unit 228 outputs the symbol to the terminal signal decoding unit 229. The terminal signal decoding unit 229 decodes the symbol to obtain terminal transmission data which is data transmitted by the terminal station 3. The terminal signal decoding unit 229 outputs the terminal transmission data to the transmission data modulation unit 263.

The base station 4e includes a plurality of antenna stations 410, a MIMO reception unit 420, a base station signal reception processing unit 430, and a communication state measurement unit 423. The base station signal reception processing unit 430 obtains terminal transmission data transmitted by the terminal station 3 from the received signal (baseband signal) converted into the electrical signal by the MIMO reception unit 420.

Fourth Modification of Fifth Embodiment

Figure 16:
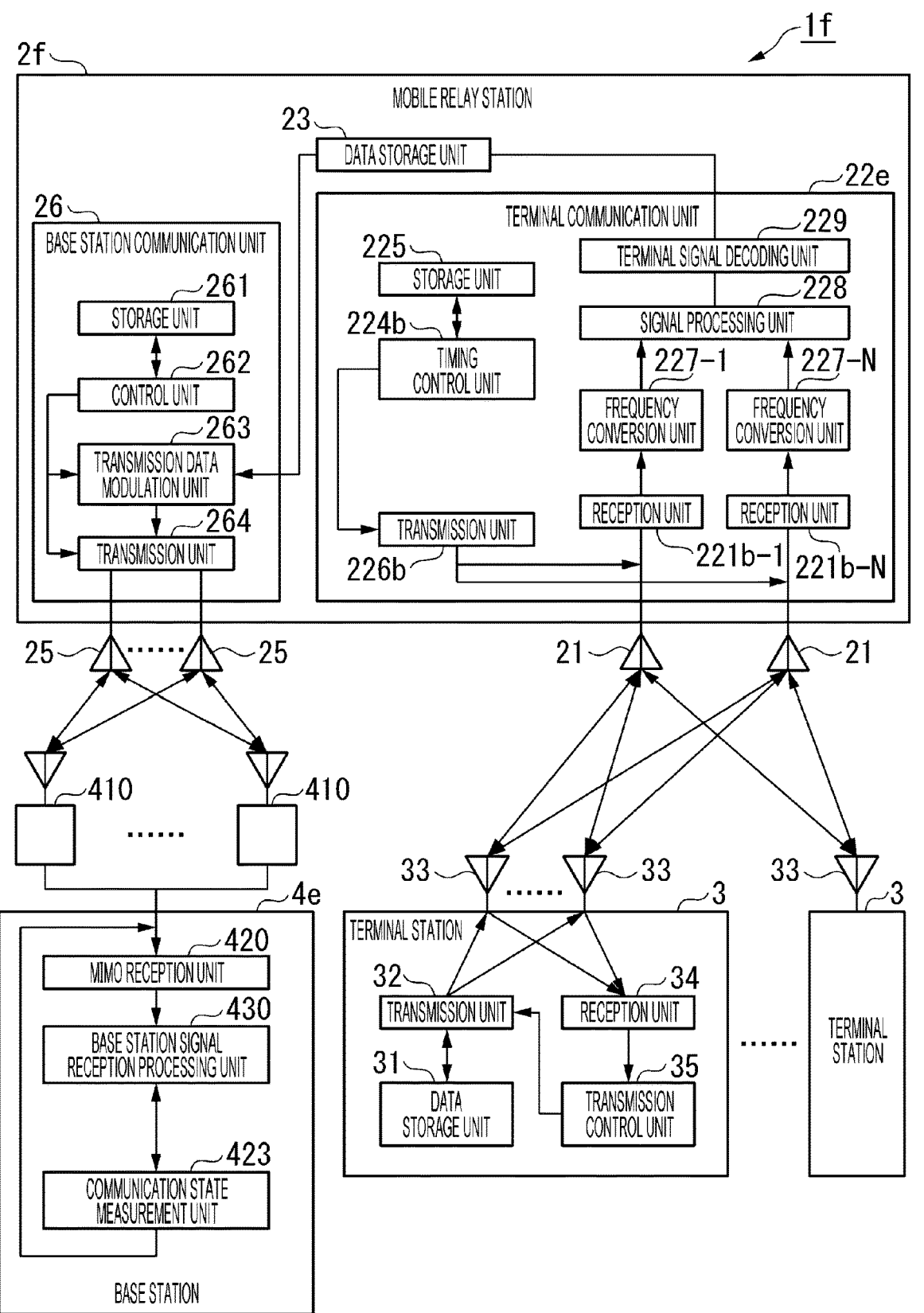
FIG. 16 is a configuration diagram of the wireless communication system according to a fourth modification of the fifth embodiment.

FIG. 16 is a configuration diagram of the wireless communication system according to a fourth modification of the fifth embodiment. One of the differences from the third modification of the fifth embodiment is that a mobile relay station 2f includes a data storage unit. The same configurations as those of the wireless communication system 1e according to the third modification of the fifth embodiment illustrated in FIG. 15 are assigned with the same reference numerals as those used in FIG. 15, and explanation thereof is not made herein.

A wireless communication system if includes a mobile relay station 2f, a terminal station 3, and a base station 4e. The mobile relay station 2f includes a terminal communication unit 22e, a data storage unit 23, and a base station communication unit 26. The terminal signal decoding unit 229 records terminal transmission data in the data storage unit 23. The data storage unit 23 stores the terminal transmission data. The data storage unit 23 outputs the terminal transmission data to the transmission data modulation unit 263.

In each embodiment described above, a case where the moving object in which the mobile relay station is provided is an LEO satellite has been described, however, the moving body may be another flight vehicle that flies through the sky, such as a geostationary orbit satellite, a drone, or a HAPS.

According to each embodiment described above, a wireless communication system includes a plurality of communication devices existing at different locations, a relay device provided in a moving body and wirelessly communicating with the plurality of communication devices, and a base station device. For example, the communication device is the terminal station 3 in the embodiments, the relay device is the mobile relay stations 2, 2a, 2b, 2c, 2d, and 2e in the embodiments, and the base station device is the base stations 4, 4a, 4b, 4c, 4d, and 4e in the embodiments.

The moving body is a low earth orbit satellite, and the communication device is provided in, for example, an IoT terminal. The signal transmitted from the communication device may be a signal indicating sensor data measured by the IoT terminal.

Figure 17:
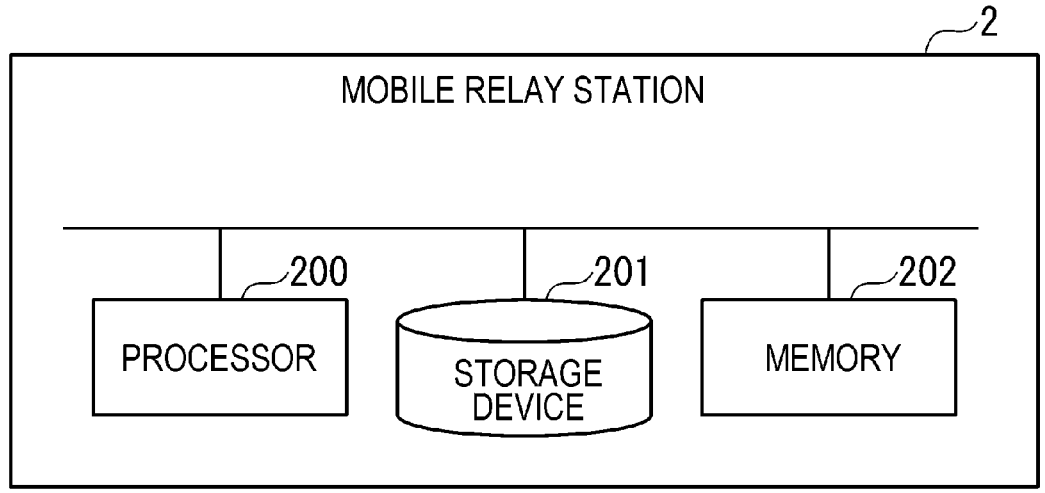
FIG. 17 is a diagram illustrating an example of a hardware configuration of the mobile relay station in each embodiment.

FIG. 17 is a diagram illustrating an example of a hardware configuration of the mobile relay station 2. Some or all of the functional units of the mobile relay station 2 are implemented as software by a processor 200 such as a central processing unit (CPU) executing a program stored in a memory 202 including a nonvolatile recording medium (non-transitory recording medium). The program may be recorded on a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 201 such as a hard disk built in a computer system. Some or all of the functional units of the mobile relay station 2 may be realized using hardware including an electronic circuit (electronic circuit or circuitry) in which, for example, a large scale integrated circuit (LSI), an application specific integrated circuit (ASIC), a programmable logic device (PLD), a FPGA, or the like is used.

Although the embodiments of the present invention have been described in detail with reference to the drawings, specific configurations are not limited to the embodiments, and include design and the like within the scope of the present invention without departing from the gist of the present invention.

REFERENCE SIGNS LIST

1, 1a, 1b, 1c, 1d, 1e, 1f Wireless communication system
2, 2a, 2b, 2c, 2d, 2e, 2f Mobile relay station
3 Terminal station
4, 4a, 4b, 4c, 4d, 4e Base station
21, 21-1 to 21-N Antenna
22, 22b, 22c Terminal communication unit
23 Data storage unit
24 Base station communication unit
25 Antenna
26 Base station communication unit
27 Inter-relay station communication unit
28 Antenna
31 Data storage unit
32 Transmission unit
33 Antenna
34 Reception unit
35 Transmission control unit
41 Antenna
42 Reception unit
43 Base station signal reception processing unit
44 Terminal signal reception processing unit
100 Beam
101 Beam
102 Small area
103 Irradiation range
200 Processor
201 Storage device
202 Memory
221, 221b, 221b-1 to 221b-N Reception unit
222, 222b, 222b-1 to 222b-N Reception waveform recording unit
223, 223b Communication state measurement unit
224, 224b Timing control unit
225 Storage unit
226, 226b Transmission unit
227 Frequency conversion unit
241 Storage unit
242 Control unit
243 Transmission data modulation unit
244 Transmission unit
261 Storage unit
262 Control unit
263 Transmission data modulation unit
264 MIMO transmission unit
410 Antenna station
420 MIMO reception unit
430 Base station signal reception processing unit
440 Terminal signal reception processing unit
441 Signal processing unit
442 Terminal signal decoding unit

450 Terminal signal reception processing unit
451 Distribution unit
452, 452-1 to 452-N Frequency conversion unit
453 Signal processing unit
454 Terminal signal decoding unit

The invention claimed is:

1. A wireless communication system comprising: one or more communication devices located in a communication target area; and a relay device mountable on a moving body, wherein the relay device includes:

a timing controller that generates a transmission permission signal that is a signal representing transmission permission of an uplink signal; and a first transmitter that transmits the transmission permission signal to the communication target area by a beam, and the communication device includes:

a receptor that obtains the transmission permission signal from the relay device;

a transmission controller that determines an earlier transmission timing as an elevation angle of the relay device viewed from the communication device is larger on a basis of the transmission permission signal; and a second transmitter that transmits the uplink signal to the relay device at the transmission timing, wherein the transmission controller subtracts a subtraction value, which is a variable value used for subtraction, from a backoff counter value of zero or more derived on a basis of a predetermined upper limit value, determining the timing when the backoff counter value becomes zero or less as the transmission timing, the backoff counter value is a random number value with the predetermined upper limit as its upper bound, and the timing controller updates the predetermined upper limit on a basis of a predicted value of the transmission timing.

2. The wireless communication system according to claim 1, wherein the timing controller determines a transmission level of the transmission permission signal, the first transmitter transmits the transmission permission signal to the communication target area by a beam at the determined transmission level, and the transmission controller derives the subtraction value, which is the variable value used for subtraction, to a larger value as a reception level of the transmission permission signal is higher, subtracts the subtraction value from a backoff counter value of zero or more derived on a basis of a predetermined upper limit value, and determines a timing at which the backoff counter value becomes zero or less as the transmission timing.

3. The wireless communication system according to claim 2, wherein the first transmitter uses an antenna to tilt the beam rearward in a moving direction of the relay device such that a pattern of the beam spreads rearward in the moving direction of the relay device in the communication target area.

4. The wireless communication system according to claim 3, wherein the timing controller controls a direction of a beam of the transmission permission signal and a transmission level of the transmission permission signal such that a reception level of the transmission permission signal becomes equal to or higher than a predetermined level in the communication device in an area in which a density degree of the communication device is equal to or higher than a predetermined threshold in a case where an area in which the density degree of the communication device is equal to or higher than a predetermined threshold is in the communication target area on the ground in a moving direction of the relay device.

5. The wireless communication system according to claim 1, wherein the timing controller includes, in the transmission permission signal, a parameter that makes a transmission timing of the uplink signal earlier as an elevation angle of the relay device viewed from the communication device is larger, the first transmitter transmits the transmission permission signal including the parameter to each small area of the communication target area in a time division manner, and the transmission controller determines the transmission timing on a basis of the parameter.

6. The wireless communication system according to claim 1, wherein the moving body is a low earth orbit satellite.

7. A communication device that is located in a communication target area and transmits an uplink signal to a relay device mountable on a moving body, the communication device comprising:

a receptor configured to obtain a transmission permission signal from the relay device transmitting the transmission permission signal to the communication target area by a beam at a determined transmission level, the transmission permission signal being a signal representing transmission permission of the uplink signal;

a transmission controller that determines an earlier transmission timing as an elevation angle of the relay device viewed from the communication device is larger on a basis of the transmission permission signal; and a transmitter that transmits the uplink signal to the relay device at the transmission timing, wherein the transmission controller derives a subtraction value, which is a variable value used for subtraction, to a larger value as a reception level of the transmission permission signal is higher, subtracts the subtraction value from a backoff counter value of zero or more derived on a basis of a predetermined upper limit value, and determines a timing at which the backoff counter value becomes zero or less as the transmission timing.

8. A wireless communication system comprising: one or more communication devices located in a communication target area; and a relay device mountable on a moving body, wherein the relay device includes:

a timing controller that generates a transmission permission signal that is a signal representing transmission permission of an uplink signal; and a first transmitter that transmits the transmission permission signal to the communication target area by a beam, and the communication device includes:

a receptor that obtains the transmission permission signal from the relay device;

a transmission controller that determines an earlier transmission timing as an elevation angle of the relay device viewed from the communication device is larger on a basis of the transmission permission signal; and a second transmitter that transmits the uplink signal to the relay device at the transmission timing, wherein the timing controller determines a transmission level of the transmission permission signal, the first transmitter transmits the transmission permission signal to the communication target area by a beam at the determined transmission level, and the transmission controller derives a subtraction value, which is a variable value used for subtraction, to a larger value as a reception level of the transmission permission signal is higher, subtracts the subtraction value from a backoff counter value of zero or more derived on a basis of a predetermined upper limit value, and determines a timing at which the backoff counter value becomes zero or less as the transmission timing.

9. The wireless communication system according to claim 8, wherein the first transmitter uses an antenna to tilt the beam rearward in a moving direction of the relay device such that a pattern of the beam spreads rearward in the moving direction of the relay device in the communication target area.

10. The wireless communication system according to claim 9, wherein the timing controller controls a direction of a beam of the transmission permission signal and a transmission level of the transmission permission signal such that a reception level of the transmission permission signal becomes equal to or higher than a predetermined level in the communication device in an area in which a density degree of the communication device is equal to or higher than a predetermined threshold in a case where an area in which the density degree of the communication device is equal to or higher than a predetermined threshold is in the communication target area on the ground in a moving direction of the relay device.

11. The wireless communication system according to claim 8, wherein the moving body is a low earth orbit satellite.

* * * * *